United States Patent [19]
Hachiya et al.

[11] Patent Number: 5,852,156
[45] Date of Patent: Dec. 22, 1998

[54] POLYCARBONATE COMPOSITION

[75] Inventors: Hiroshi Hachiya; Kyosuke Komiya, both of Kurashiki; Tetsuo Hamada, Kamakura, all of Japan

[73] Assignee: Asahi Kasei Kogyo Kabushiki Kaisha, Osaka, Japan

[21] Appl. No.: 696,481

[22] Filed: Aug. 14, 1996

[30] Foreign Application Priority Data

Aug. 14, 1995 [JP] Japan ................................ 7-207126

[51] Int. Cl.⁶ ................................................. C08G 64/00
[52] U.S. Cl. ........................ 528/196; 528/198; 528/199; 528/200; 528/201
[58] Field of Search ................................ 528/196, 198, 528/199, 200, 201

[56] References Cited

U.S. PATENT DOCUMENTS

| | | | |
|---|---|---|---|
| 3,945,969 | 3/1976 | Horn et al. | 528/196 |
| 5,288,838 | 2/1994 | Sivaram et al. | 528/199 |
| 5,300,623 | 4/1994 | Boden et al. | 528/199 |
| 5,380,814 | 1/1995 | Totani et al. | 528/199 |
| 5,466,774 | 11/1995 | Kanno et al. | 528/199 |

FOREIGN PATENT DOCUMENTS

| | | | |
|---|---|---|---|
| 1-146926 | 6/1989 | Japan | C08G 63/62 |
| 5-156000 | 6/1993 | Japan | C08G 64/30 |
| 7-53709 | 2/1995 | Japan | C08G 64/30 |

Primary Examiner—Terressa Mosley
Attorney, Agent, or Firm—Jacobson, Price, Holman & Stern, PLLC

[57] ABSTRACT

A polycarbonate composition comprises (a) a substantially chlorine-atom free, aromatic dihydroxy compound/carbonic diester transesterification polycarbonate, and the following components (b), (c) and (d) in specifically, extremely limited amounts, wherein component (b) is at least one metal selected from an alkali metal and an alkaline earth metal, component (c) is an aromatic monohydroxy compound, and component (d) is at least one member selected from an oligomer having a weight average molecular weight of 1,000 or less and a residual monomer. This polycarbonate composition is substantially free from occurrence of crazing, even when it experiences moist heat, and especially even when it has been recycled. Further, when this polycarbonate composition is continuously injection-molded, not only can the molding be carried out with less necessity of interruption for mold cleaning, but also even when the continuous molding is interrupted for mold cleaning or for other reasons and then restarted, occurrence of unfavorable phenomena (such as deposition of black spots, i.e., carbonized material waste, and development of brown streaks, uneven color and the like) can be effectively suppressed.

18 Claims, 2 Drawing Sheets

POLYCARBONATE COMPOSITION

BACKGROUND OF THE INVENTION

1. Field of the Invention

The present invention relates to a polycarbonate composition. More particularly, the present invention is concerned with a polycarbonate composition comprising (a) a substantially chlorine-atom free, aromatic dihydroxy compound/carbonic diester transesterification polycarbonate, and the following components (b), (c) and (d) in specifically, extremely limited amounts, wherein component (b) is at least one metal selected from the group consisting of an alkali metal and an alkaline earth metal, component (c) is an aromatic monohydroxy compound, and component (d) is at least one member selected from the group consisting of an oligomer having a weight average molecular weight of 1,000 or less and a residual monomer. The polycarbonate composition of the present invention has an advantage in that it is substantially free from occurrence of crazing, even when it experiences moist heat, and especially even when it has been recycled. Further, the polycarbonate composition of the present invention is also advantageous in that, when it is continuously injection-molded, the molding can be carried out with less necessity of interruption for mold cleaning, and that, even when continuous molding is interrupted for mold cleaning or for other reasons and then restarted, occurrence of unfavorable phenomena, such as deposition of black spots (carbonized material waste), and development of brown streaks, uneven color and the like, can be effectively suppressed, which unfavorable phenomena have conventionally been observed when a continuous molding is interrupted and restarted.

2. Prior Art

In recent years, polycarbonates have been widely used in various fields as engineering plastics which have excellent heat resistance, impact resistance and transparency.

However, polycarbonates have several problems. First, a polycarbonate inherently has a defect in that it is poor in hydrolysis resistance due to the chemical structure thereof. Therefore, when a polycarbonate experiences moist heat, a decrease in molecular weight thereof occurs, so that the mechanical properties of the polycarbonate are caused to lower.

Second, when a polycarbonate which has once experienced moist heat is placed under room humidity and temperature conditions, the polycarbonate releases the moisture which has been absorbed at the time of exposure of the polycarbonate to moist heat. The released moisture does not go out of the polycarbonate, but rather gathers at defective portions (such as foreign matters, heat-deteriorated portions and the like) within the polycarbonate. As a result, stress is generated around the defective portions of the polycarbonate at which the moisture gathers, and the stress produces crazing and in turn causes not only the mechanical properties but also the appearance of the polycarbonate to be lowered. Crazing occurs even after a polycarbonate experiences relatively mild moist heat such that a decrease in molecular weight of the polycarbonate does not occur. Therefore, it has strongly been desired to prevent occurrence of crazing. Since recycling of a polycarbonate causes heat-deterioration of the polycarbonate, crazing tends to occur especially in molded products which are produced from recycled waste portions by-produced in molding, such as runners, sprue, trimmed edges and the like. Especially in the recent tendency to save and recycle resources, it has been desired to prevent occurrence of crazing in molded articles produced from recycled resources.

Third, with respect to an aromatic polycarbonate, it is poor in flowability, so that molding of an aromatic polycarbonate has to be conducted at a temperature as high as 250° to 360° C. Due to such a high molding temperature, a molded article of an aromatic polycarbonate is likely to suffer from unfavorable phenomena, such as deposition of black spots, and development of brown streaks, uneven color and the like. In addition, an aromatic polycarbonate has poor mold release characteristics. For the above reasons, it is difficult to use an aromatic polycarbonate for producing an injection-molded article which is required to have a good appearance, especially for producing a molded transparent article. Further, when a continuous injection molding of an aromatic polycarbonate is conducted, a problem arises such that, since the molded articles are likely to have poor appearance, and mold release characteristics are poor, the continuous injection molding has to be frequently interrupted for cleaning the mold, as compared to a continuous injection molding of other resins. Moreover, even when the continuous injection molding is restarted after the cleaning of the mold, a problem arises such that unfavorable phenomena, such as deposition of black spots, and development of brown streaks, uneven color and the like, markedly occur in the resultant molded articles, and these unfavorable phenomena continue to occur until a large number of molded articles are produced. Furthermore, even after occurrence of such unfavorable phenomena has temporarily ceased after the restart of the continuous injection molding (that is, even after good articles have begun to be produced), molded articles still sometimes suffer from unfavorable phenomena, such as deposition of black spots, which are fatal defects for injection-molded articles. Also, the above-mentioned problem occurring at the restart of the molding after the interruption for cleaning the mold also arises even when the molding is restarted after an interruption of the molding for lunch time or weekend, or after an interruption due to an accident to the molding machine or other troubles in the molding process. Therefore, it has been earnestly desired to solve the above-mentioned problems.

Conventionally, for solving the above-mentioned first problem of a polycarbonate, i.e., the poor hydrolysis resistance problem of a polycarbonate, it was proposed that the amount of a phosphorus compound (thermal stabilizer) usually added to a polycarbonate is decreased, or that a phosphorus thermal stabilizer having high hydrolysis resistance is added to a polycarbonate.

Also, for obtaining polycarbonates having improved properties (including improved hydrolysis resistance), there were some proposals in which attention is paid to the amounts of trace substances contained in the polycarbonate.

As examples of proposals for improving the properties of a polycarbonate other than hydrolysis resistance (such as discoloration resistance, non-corrosive properties and the like), which proposals pay attention to the amounts of trace substances, the following prior art documents can be mentioned. Unexamined Japanese Patent Application Laid-Open Specification No. 7-53709 discloses a polycarbonate containing, as trace substances, not more than 50 ppm of a free aromatic monohydroxy compound, not more than 50 ppm of a free aromatic dihydroxy compound and not more than 50 ppm of a free aromatic carbonic diester. This prior art document describes that this polycarbonate has low toxicity and corrosive properties (corrosive properties are due to the presence of impurities), and that a molded article of the polycarbonate is less likely to suffer from development of brown streaks, lowering in molecular weight and deterioration of physical properties. Unexamined Japanese Patent Application Laid-Open Specification No. 5-156000 discloses a polycarbonate containing, as trace substances, not more than 1,000 ppm of a monovalent phenol, not more than 1,000 ppm of a divalent hydroxy compound and not more than 2,000 ppm of a carbonic diester. This prior art document describes that this polycarbonate is improved in thermal stability, especially in discoloration resistance. Unexamined Japanese Patent Application Laid-Open Specification No. 5-148355 discloses a polycarbonate containing, as trace substances, not more than 5 ppm of iron, not more than 1 ppm of sodium and not more than 10 ppm of chlorine, and having a terminal hydroxyl group in an amount of at most 20 mole %, based on the molar total of all terminal groups thereof. This prior art document describes that this polycarbonate is improved in discoloration resistance. Unexamined Japanese Patent Application Laid-Open Specification No. 6-100683 (corresponding to EP-A-0 293 769) discloses a polycarbonate for use in preparing a substrate for an optical disk, which is produced by the phosgene process (interfacial process) and contains, as trace substances, not more than 20 ppm of methylene chloride and not more than 20 ppm of an unreacted bisphenol. This prior art document describes that an optical disk substrate produced from this polycarbonate exhibits less corrosion to and improved adhesion to a recording layer.

As examples of proposals for improving the hydrolysis resistance of a polycarbonate, in which attention is paid to the amounts of trace substances, the following prior art documents can be mentioned. Unexamined Japanese Patent Application Laid-Open Specification No. 1-146926 discloses a polycarbonate for use in preparing a substrate for an optical disk, which is produced by the phosgene process and contains, as trace substances, not more than 0.2% by weight of a low molecular weight polycarbonate having a polymerization degree of 1 to 3 and not more than 10 ppm by weight of an unreacted bisphenol. This prior art document describes that a substrate for an optical disk prepared from this polycarbonate is less likely to suffer from occurrence of white spots therein. Unexamined Japanese Patent Application Laid-Open Specification No. 63-278929 discloses a process for producing an optical article by molding a polycarbonate having a molecular weight of from 13,000 to 18,000 and containing, as a trace substance, less than 0.3% by weight of a low molecular weight polycarbonate. This prior art document describes that this polycarbonate is less likely to cause occurrence of mold smudges and exhibits improved resistance to moist heat, which moist heat adversely affects the transparency and physical properties of a molded article.

Thus, it is known that there is a relationship between the amounts of trace substances contained in a polycarbonate and the properties of the polycarbonate, such as discoloration resistance, non-corrosive properties, hydrolysis resistance and the like. However, it has not been known at all that a polycarbonate composition comprising a polycarbonate and other specific components, wherein the other components are present in specifically, extremely limited amounts, can solve the above-mentioned second problem, that is, the problem of crazing occurring when a polycarbonate experiences moist heat, and especially even when the polycarbonate has been recycled.

Also with respect to the third problem, especially occurrence of unfavorable deposition of black spots and the like, which are frequently observed when a continuous molding is interrupted and restarted, no attempt was conventionally made for solving the problem. It was only tried to improve the thermal stability of a polycarbonate, which has to be molded at high temperatures due to its poor flowability, as mentioned above. For example, for improving the thermal stability of a polycarbonate produced by the phosgene process, various types of thermal stabilizers, such as thermal stabilizers comprising a phosphorous triester, an epoxy compound, a hindered phenol or the like, have been used. By the use of such a thermal stabilizer, the thermal stability of the polycarbonate can be improved; however, the above-mentioned unfavorable phenomena, such as deposition of black spots and the like, which are observed when a continuous molding is interrupted and restarted, cannot be satisfactorily suppressed.

It is known that a polycarbonate produced by the phosgene process contains chlorine atoms in an amount as large as not less than 50 ppm, which chlorine atoms adversely affect the thermal stability of the polycarbonate. Recently, a large number of researches and developments have been made for improving thermal stability of a polycarbonate produced by a transesterification process, especially a melt transesterification process (hereinafter, frequently referred to simply as "melt process") (the polycarbonate produced by the melt process is substantially free of a chlorine atom). For example, there have been proposed a composition comprising a polycarbonate obtained by the melt process using a catalyst containing an alkali metal and a nitrogen-containing compound, and a thermal stabilizer comprising a phosphorus compound, a phenolic compound or an epoxy compound (see Unexamined Japanese Patent Application Laid-Open Specification No. 4-36346); a composition comprising a polycarbonate obtained by the melt process, and a phosphite compound, a mixture of a phosphite compound and a hindered phenol thermal stabilizer, or a phosphonite compound (see Unexamined Japanese Patent Application Laid-Open Specification Nos. 4-15221, 4-15222 and 4-15223); a composition comprising a polycarbonate obtained by the melt process, and an acid phosphate (see Unexamined Japanese Patent Application Laid-Open Specification No. 5112706); and a composition comprising a polycarbonate obtained by the melt process using a catalyst containing an alkali metal and a nitrogen-containing compound, and an acidic compound (see Examined Japanese Patent Application Publication No. 6-92529, corresponding to EP-A-0 435 124). By the above-mentioned techniques, however, occurrence of unfavorable phenomena, such as deposition of black spots, and development of brown streaks, uneven color and the like, cannot be suppressed (the above-mentioned unfavorable phenomena have conventionally been observed when a continuous molding is interrupted and restarted).

Also, for improving thermal stability of a polycarbonate obtained by the melt process, proposals have been made in which attention is paid to the amounts of trace substances in the polycarbonate (see, for example, the above-mentioned Unexamined Japanese Patent Application Laid-Open Specification Nos. 5-148355, 5-156000 and 7-53709). However, in these techniques also, occurrence of the above-mentioned unfavorable phenomena cannot be suppressed (the above-mentioned unfavorable phenomena have conventionally been observed when a continuous molding is interrupted and restarted).

Thus, it has not yet been achieved to suppress occurrence of the unfavorable phenomena (such as deposition of black spots, and development of brown streaks, uneven color and the like), which have conventionally been observed when a continuous molding is interrupted and restarted. Further, it has not been known at all that there is a relationship between the amount of trace substances contained in a polycarbonate and occurrence of the above-mentioned unfavorable phenomena in the polycarbonate.

SUMMARY OF THE INVENTION

In order to solve the above-mentioned serious problems, the present inventors have made extensive and intensive studies on the relationships between trace substances contained in a polycarbonate and occurrence of not only crazing but also the above-mentioned unfavorable phenomena (such as deposition of black spots, and development of brown streaks and uneven color) in the polycarbonate. As a result, it has unexpectedly been found that a polycarbonate composition comprising (a) a substantially chlorine-atom free, aromatic dihydroxy compound/carbonic diester transesterification polycarbonate, and the following components (b), (c) and (d) in specifically, extremely limited amounts, wherein component (b) is at least one metal selected from the group consisting of an alkali metal and an alkaline earth metal, component (c) is an aromatic monohydroxy compound, and component (d) is at least one member selected from the group consisting of an oligomer having a weight average molecular weight of 1,000 or less and a residual monomer, is substantially free from occurrence of crazing, even when it experiences moist heat, and especially even when it has been recycled. It has also unexpectedly been found that, when such a polycarbonate composition is continuously injection-molded, not only can the molding be carried out with less necessity of interruption for mold cleaning, but also even when the continuous molding is interrupted for mold cleaning or for other reasons and then restarted, occurrence of unfavorable phenomena (such as deposition of black spots, i.e., carbonized material waste, and development of brown streaks, uneven color and the like) can be effectively suppressed, which unfavorable phenomena have. conventionally been observed when a continuous molding is interrupted and restarted. The present inventors have also found that, by adding a specific thermal stabilizer to the above-mentioned polycarbonate composition, occurrence of deposition of black spots or the like can be further suppressed to a large extent. Based on the above findings, the present invention has been completed.

Therefore, it is a primary object of the present invention to provide a polycarbonate composition which has an advantage not only in that it is substantially free from occurrence of crazing, even when it experiences moist heat, and especially even when it has been recycled, but is also advantageous in that, when it is continuously injection-molded, the molding can be carried out with less necessity of interruption for mold cleaning, and that, even when the continuous molding is interrupted for mold cleaning or for other reasons and then restarted, occurrence of unfavorable phenomena (such as deposition of black spots, i.e., carbonized material waste, and development of brown streaks, uneven color and the like) can be effectively suppressed, which unfavorable phenomena have conventionally been observed when a continuous molding is interrupted and restarted.

The foregoing and other objects, features and advantages of the present invention will be apparent from the following detailed description and appended claims taken in connection with the accompanying drawings.

Figure 1:
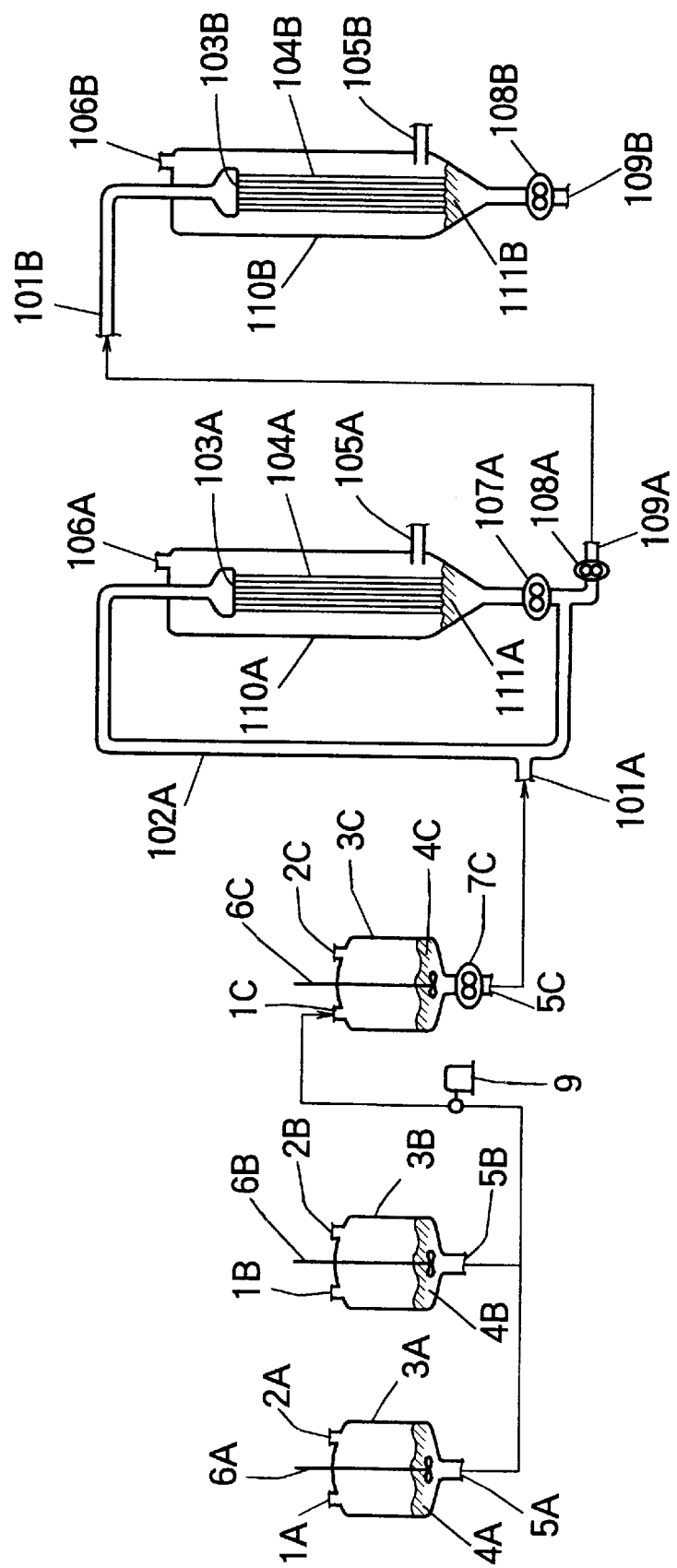
FIG. 1 is a diagram showing the system employed for producing a polycarbonate in Example 1.

Description Reference Numerals (FIG. 1)

1A–6A: Numerals assigned in connection with first vertical agitation type polymerizer vessel (A)

1B–6B: Numerals assigned in connection with first vertical agitation type polymerizer vessel (B)

1C–7C: Numerals assigned in connection with second vertical agitation type polymerizer vessel (C)

101A–111A: Numerals assigned in connection with first wire-wetting fall polymerizer

101B–111B: Numerals assigned in connection with second wire-wetting fall polymerizer

1A, 1B: Inlet for a starting material

1C: Inlet for a prepolymer

2A, 2B, 2C: Vent

3A, 3B: First vertical agitation type polymerizer vessels (A) and (B)

3C: Second vertical agitation type polymerizer vessel (C)

4A, 4B, 4C: Molten prepolymer

5A, 5B, 5C: Outlet

6A, 6B, 6C: Agitator

7C, 9: Transfer pump

101A, 101B: Inlet for a polymerizing material

102A: Recirculation line

103A, 103B: Perforated plate

104A, 104B: Wire

105A, 105B: Gas feed port

106A, 106B: Vent

107A: Recirculation pump

108A: Transfer pump

108B: Discharge pump

109A,109B: Outlet

110A,110B: Main body of wire-wetting fall polymerizer

111A: Molten Prepolymer

Figure 2:
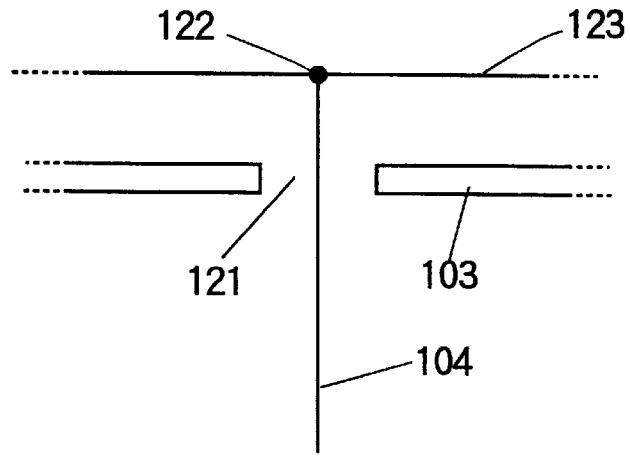
FIGS. 2 to 4 show various manners for securely holding a wire in a wire-wetting fall polymerizer.
Figure 3:
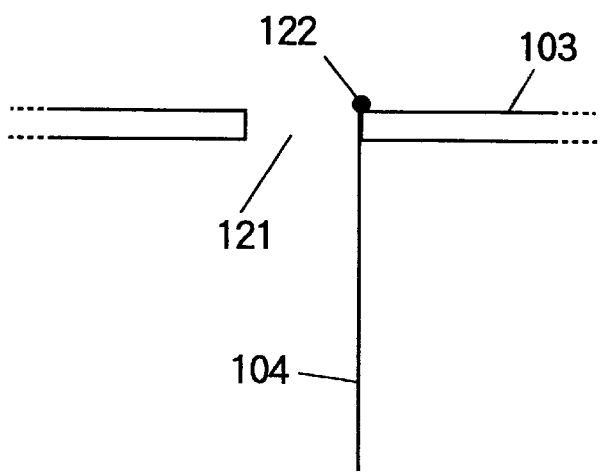
Figure 4:
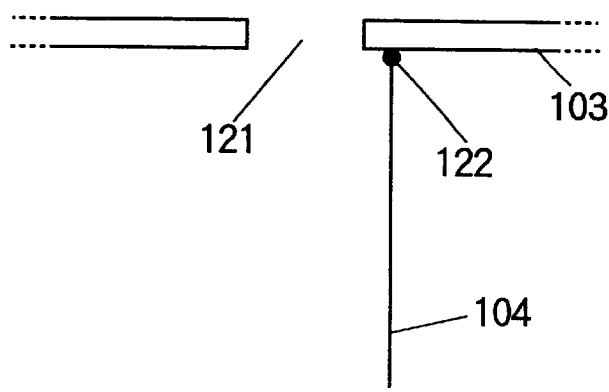

111B: Molten Polymer (FIGS. 2 to 4)

103: Perforated plate

104: Wire

121: Hole of a perforated plate

122: Fixation point of wire

123: Support rod for wire

DETAILED DESCRIPTION OF THE INVENTION

According to the present invention, there is provided a polycarbonate composition comprising:

(a) a substantially chlorine-atom free, aromatic dihydroxy compound/carbonic diester transesterification polycarbonate, (b) at least one metal selected from the group consisting of an alkali metal and an alkaline earth metal, (c) an aromatic monohydroxy compound, and (d) at least one member selected from the group consisting of:

an aromatic dihydroxy compound/carbonic diester transesterification oligomer having a weight average molecular weight of 1,000 or less; and a residual monomer selected from the aromatic dihydroxy compound and the carbonic diester and a mixture thereof, the components (b), (c) and (d) being, respectively, present in amounts of not more than 800 ppb (parts per billion) by weight, not more than 200 ppm by weight, and not more than $T_2\%$ by weight, each based on the total weight of the components (a), (b), (c) and (d), wherein $T_2$ is defined by the following formula:

$T_2 = 1,520,000 \times (\text{weight average molecular weight of the polycarbonate})^{-1.44}$.

For easy understanding of the present invention, the essential features and various embodiments of the present invention are enumerated below.

(1) A polycarbonate composition comprising:

(a) a substantially chlorine-atom free, aromatic dihydroxy compound/carbonic diester transesterification polycarbonate, (b) at least one metal selected from the group consisting of an alkali metal and an alkaline earth metal, (c) an aromatic monohydroxy compound, and (d) at least one member selected from the group consisting of:
an aromatic dihydroxy compound/carbonic ester transesterification oligomer having a weight average molecular weight of 1,000 or less; and
a residual monomer selected from the aromatic dihydroxy compound and the carbonic diester and a mixture thereof,
the components (b), (c) and (d) being, respectively, present in amounts of not more than 800 ppb by weight, not more than 200 ppm by weight, and not more than $T_2\%$ by weight, each based on the total weight of the components (a), (b), (c) and (d), wherein $T_2$ is defined by the following formula:

$T_2 = 1,520,000 \times (\text{weight average molecular weight of the polycarbonate})^{-1.44}$.

(2) The polycarbonate composition according to item (1) above, wherein the amounts of the components (b), (c) and (d) are, respectively, from 1 to 800 ppb by weight, from 1 to 200 ppm by weight, and from $T_1$ to $T_2\%$ by weight, each based on the total weight of the components (a), (b), (c) and (d), wherein $T_1$ is defined by the following formula:

$T_1 = 1,130,000 \times (\text{weight average molecular weight of the polycarbonate})^{-1.60}$, and $T_2$ is as defined above.

(3) The polycarbonate composition according to item (1) or (2) above, which further comprises (e) a thermal stabilizer in an amount of from 0.0005 to 0.22 part by weight, relative to 100 parts by weight of the total of the components (a), (b), (c) and (d).

(4) The polycarbonate composition according to item (3) above, wherein the thermal stabilizer (e) comprises at least one member selected from the group consisting of a phosphorous diester and a phosphorous monoester, the component (e) being present in an amount of from 0.0005 to 0.015 part by weight, relative to 100 parts by weight of the total of the components (a), (b), (c) and (d).

(5) The polycarbonate composition according to item (3) above, wherein the thermal stabilizer (e) comprises a mixture of ($\alpha$) at least one member selected from the group consisting of a phosphorous diester and a phosphorous monoester, and ($\beta$) at least one member selected from the group consisting of a phenolic antioxidant, a phosphorous triester and a phosphinic diester, the components ($\alpha$) and ($\beta$) being, respectively, present in amounts of from 0.0005 to 0.015 part by weight and from 0.0005 to 0.1 part by weight, each relative to 100 parts by weight of the total of the components (a), (b), (c) and (d).

(6) The polycarbonate composition according to item (1) or (2) above, wherein the polycarbonate has a terminal hydroxyl group in an amount of at most 30 mole %, based on the molar total of all terminal groups of the polycarbonate.

(7) The polycarbonate composition according to item (1) or (2) above, wherein the polycarbonate is obtained at a transesterification reaction temperature of not higher than 280° C.

(8) The polycarbonate composition according to item (1) or (2) above, wherein the polycarbonate exhibits an absorbance of less than 0.01 at a wavelength of 400 nm in spectrophotometry, as measured with respect to a sample obtained by dissolving 1.0 g of the polycarbonate in 7 ml of methylene chloride and placing the resultant solution in a cell having a light pass length of 1 cm.

(9) The polycarbonate composition according to item (1) or (2) above, wherein the polycarbonate has a weight average molecular weight in the range of from 12,000 to 80,000.

(10) A molded article comprising the polycarbonate composition according to item (1) or (2) above.

(11) A molded article comprising the polycarbonate composition according to item (3) above.

(12) A molded article comprising the polycarbonate composition according to item (4) above.

(13) A molded article comprising the polycarbonate composition according to item (5) above.

(14) A molded article comprising the polycarbonate composition according to item (6) above.

(15) A molded article comprising the polycarbonate composition according to item (7) above.

(16) A molded article comprising the polycarbonate composition according to item (8) above.

(17) A molded article comprising the polycarbonate composition according to item (9) above.

In the polycarbonate composition of the present invention, a substantially chlorine-atom free polycarbonate as component (a) is produced from an aromatic dihydroxy compound and a carbonic diester by transesterification therebetween.

In the present invention, the terminology "aromatic dihydroxy compound" means a compound represented by the following formula:

HO—Ar—OH wherein Ar represents a divalent aromatic group.

Preferred examples of divalent aromatic groups as Ar include a group represented by the following formula:

—Ar$^1$—Y—Ar$^2$— wherein each of Ar$^1$ and Ar$^2$ independently represents a divalent carbocyclic or heterocyclic aromatic group having from 5 to 70 carbon atoms, and Y represents a divalent alkane group having from 1 to 30 carbon atoms.

In the divalent carbocyclic or heterocyclic aromatic groups as Ar$^1$ and Ar$^2$, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and/or a nitro group.

Examples of heterocyclic aromatic groups as $Ar^1$ and $Ar^2$ include an aromatic group having at least one hetero atom, such as a nitrogen atom, an oxygen atom or a sulfur atom.

Illustrative examples of divalent carboxylic or heterocyclic aromatic groups as $Ar^1$ and $Ar^2$ include an unsubstituted or substituted phenylene group, an unsubstituted or substituted biphenylene group and an unsubstituted or substituted pyridylene group. Substituents for these groups are as described above.

Examples of divalent alkane groups as Y include organic groups respectively represented by the following formulae:

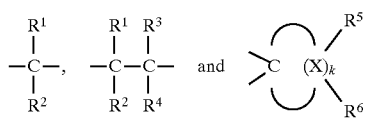

wherein each of $R^1$, $R^2$, $R^3$ and $R^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms and a carbocyclic aralkyl group having from 6 to 10 ring-forming carbon atoms; k represents an integer of from 3 to 11; each X represents a carbon atom and has $R^5$ and $R^6$ bonded thereto; each $R^5$ independently represents a hydrogen atom or an alkyl group having from 1 to 6 carbon atoms, and each $R^6$ independently represents a hydrogen atom or an alkyl group having from 1 to 6 carbon atoms, wherein $R^5$ and $R^6$ are the same or different;

wherein at least one hydrogen atom of each of $R^1$, $R^2$, $R^3$, $R^4$, $R^5$ and $R^6$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and/or a nitro group.

Specific examples of divalent aromatic groups as Ar include groups respectively represented by the following formulae:

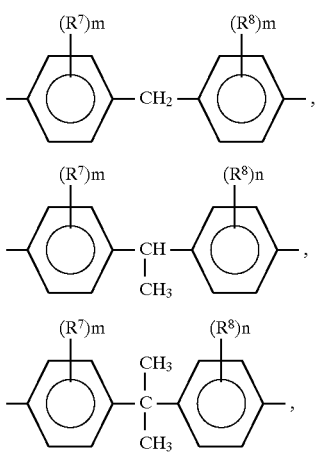

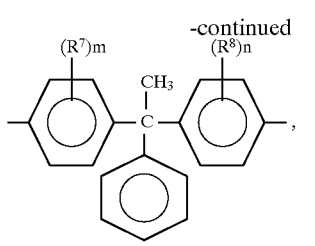

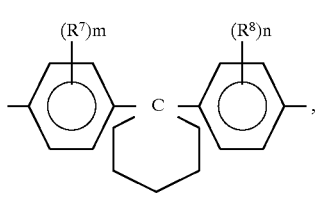

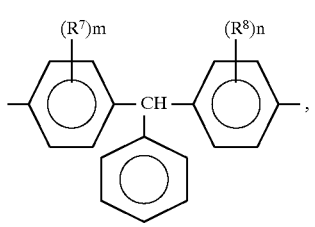

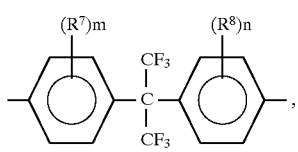

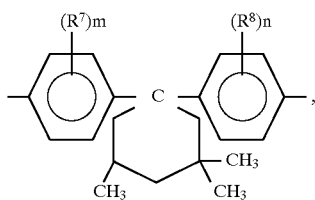

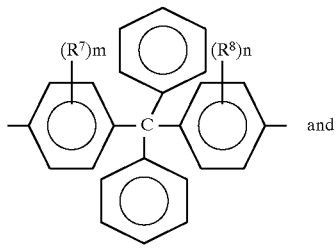

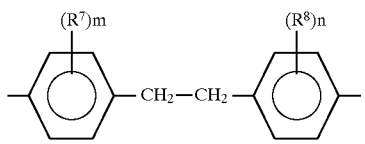

wherein each of $R^7$ and $R^8$ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or a phenyl group; each of m and n independently represents an integer of from 1 to 4, with the proviso that when m is an integer of from 2 to 4, $R^7$'s are the same or different, and when n is an integer of from 2 to 4, $R^8$'s are the same or different.

Further, examples of divalent aromatic groups as Ar also include those which are represented by the following formula:

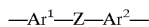

wherein $Ar^1$ and $Ar^2$ are as defined above; and z represents a single bond, or a divalent group, such as —O—, —CO—, —S—, —SO$_2$—, —SO—, —COO—, or —CON(R$^1$)—, wherein $R^1$ is as defined above.

Examples of such divalent aromatic groups as Ar include groups respectively represented by the following formulae:

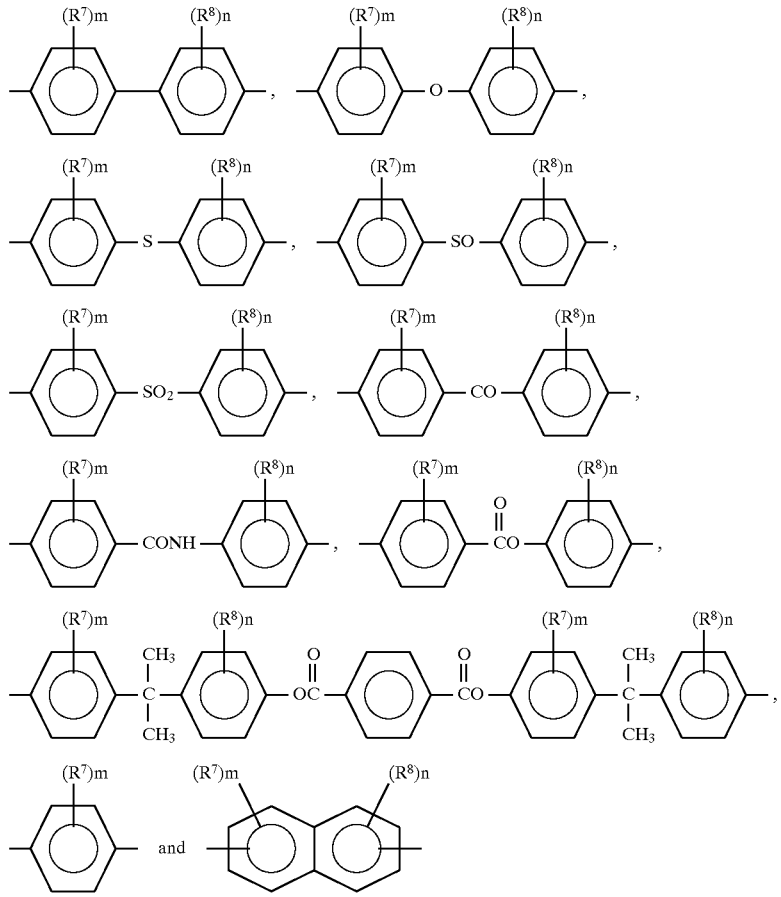

wherein $R^7$, $R^8$, m and n are as defined above.

In the present invention, the aromatic dihydroxy compounds can be used individually or in combination. Representative examples of aromatic dihydroxy compounds include bisphenol A. It is preferred to use an aromatic dihydroxy compound having a low content of chlorine atoms and alkali metals or alkaline earth metals. It is more preferred to use an aromatic dihydroxy compound substantially free from a chlorine atom, an alkali metal or an alkaline earth metal.

The carbonic diester used in the present invention is represented by the following formula:

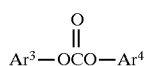

wherein each of $Ar^3$ and $Ar^4$ independently represents a monovalent aromatic group.

In each of $Ar^3$ and $Ar^4$, which independently represents a monovalent carbocyclic or heterocyclic aromatic group, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group. $Ar^3$ and $Ar^4$ are the same or different.

Representative examples of monovalent aromatic groups $Ar^3$ and $Ar^4$ include a phenyl group, a naphthyl group, a biphenyl group and a pyridyl group. These groups may or may not be substituted with the above-mentioned substitutent or substituents.

Preferred examples of monovalent aromatic groups as $Ar^3$ and $Ar^4$ include those which are respectively represented by the following formulae:

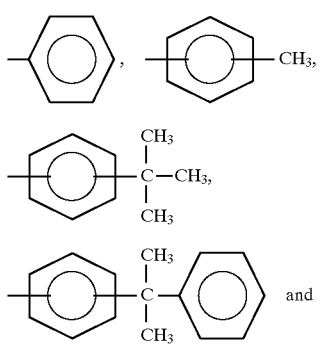

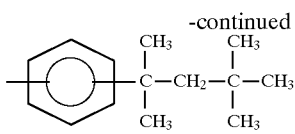

Representative examples of carbonic diesters include a di(unsubstituted or substituted)phenyl carbonate compound represented by the following formula:

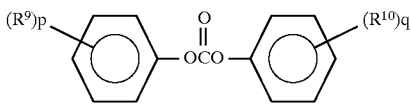

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, $R^9$'s are the same or different, and when q is an integer of from 2 or more, $R^{10}$'s are the same or different.

Of these diphenyl carbonate compounds, preferred are those having a symmetrical configuration, such as (unsubstituted) diphenyl carbonate and a diphenyl carbonate substituted with a lower alkyl group, e.g., ditolylcarbonate di-t-butylphenyl carbonate. Particularly preferred is diphenyl carbonate which has the simplest structure.

These carbonic diesters may be used individually or in combination. It is preferred that these carbonic diesters have a low content of chlorine atoms and alkali metals or alkaline earth metals. It is most preferred that these carbonic diesters are substantially free from a chlorine atom and an alkali metal or alkaline earth metal.

The ratio in which the aromatic dihydroxy compound and the carbonic diester are used (i.e., a charging ratio) may vary depending on the types of the aromatic dihydroxy compound and carbonic diester employed, the polymerization temperature and other polymerization conditions, and the desired molecular weight of a polycarbonate to be obtained and the desired proportions of the terminal groups of the polycarbonate. The carbonic diester is generally used in an amount of from 0.9 to 2.5 moles, preferably from 0.95 to 2.0 moles, more preferably from 0.98 to 1.5 moles, per mole of the is aromatic dihydroxy compound.

In the present invention, an aromatic polyhydric hydroxy compound, an aromatic monohydroxy compound and/or a carbonic diester other than the above-mentioned carbonic diester can be used in combination with the above-mentioned aromatic dihydroxy compounds and carbonic diesters, as long as the effects of the present invention are not spoiled. The aromatic polyhydric hydroxy compound may be used for introducing a branch structure to the polycarbonate. The aromatic monohydroxy compound and the carbonic diester other than the above-mentioned carbonic diesters may be used for converting the terminal hydroxyl groups of the polycarbonate and the terminal groups derived from the carbonic diester into different types of terminal groups, or for modifying the molecular weight of the polycarbonate.

In the present invention, the weight average molecular weight of the polycarbonate as component (a) is generally from 1,000 to 300,000, preferably from 5,000 to 100,000, more preferably from 12,000 to 80,000.

The proportions of terminal groups of the polycarbonate (a) are not specifically limited. However, it is preferred that the polycarbonate have a terminal hydroxyl group in an amount of at most 30 mole %, based on the molar total of all terminal groups of the polycarbonate. This is because not only can occurrence of crazing in the polycarbonate composition of the present invention be effectively suppressed even when the polycarbonate composition experiences moist heat, but also deposition of black spots can be effectively suppressed when a continuous molding is interrupted and restarted.

In the polycarbonate composition of the present invention, polycarbonate (a) is substantially free of a chlorine atom. In the present invention, the term "substantially free of a chlorine atom" means that both the following two requirements are satisfied:

(1) the chlorine atom content of the polycarbonate (a) is 0.5 ppm or less, preferably 0.1 ppm or less in terms of chlorine ion content, as measured by potentiometric titration using an aqueous 1/500N silver nitrate solution or by ion chromatography (0.1 ppm is the detection limit of these measuring methods); and (2) the chlorine atom content must be 10 ppm or less as measured by the combustion method (10 ppm or less is the detection limit of this method).

When the content of chlorine atoms in polycarbonate (a) exceeds the above-mentioned upper limits, corrosion of the material of a molding apparatus is likely to occur, so that iron ions are released from the material of the molding apparatus, and the polycarbonate composition is contaminated by the iron ions, leading to occurrence of crazing in the polycarbonate composition. In addition, due to the corrosion of the material of a molding apparatus, the surface of the molding apparatus becomes roughened, so that the polycarbonate composition is likely to adhere to and remain in the roughened surface of the molding apparatus, resulting in deposition of black spots. Further, when the surface of molding apparatus becomes roughened, the surface of the molding apparatus is activated. Accordingly, deterioration of the polycarbonate composition is accelerated, so that deposition of black spots is inevitably increased.

In the present invention, it is preferred that polycarbonate (a) exhibit an absorbance of less than 0.01 at a wavelength of 400 nm in spectrophotometry, as measured with respect to a sample obtained by dissolving 1.0 g of the polycarbonate in 7 ml of methylene chloride and placing the resultant solution in a cell having a light pass length of 1 cm. Discoloration of the polycarbonate occurs due to side reactions during a polymerization reaction. Therefore, when a polycarbonate exhibits a relatively low absorbance in spectrophotometry, that is, when a polycarbonate does not suffer from discoloration, it can be considered that occurrence of the side reactions during the polymerization reaction has been suppressed. Generally, adverse effects of the side reactions which occur during a melt polymerization reaction are equivalent to those of heat-deterioration. Therefore, when occurrence of the side reactions is suppressed during the polymerization reaction, there can be obtained a polycarbonate having not only excellent thermal stability but also less deposition of black spots even when a continuous molding is interrupted and restarted.

In the polycarbonate composition of the present invention, it is requisite that components (b), (c) and (d) be, respectively, present in amounts of not more than 800 ppb by weight, not more than 200 ppm by weight, and not more than $T_2$% by weight, each based on the total weight of components (a), (b), (c) and (d), wherein $T_2$ is defined by the following formula:

$$T_2=1{,}520{,}000\times(\text{weight average molecular weight of said polycarbonate})^{-1.44}.$$

Examples of alkali metals and alkaline earth metals include lithium, sodium, potassium, cesium, magnesium, calcium, strontium and barium. These metals contained in the polycarbonate are, for example, catalyst residues, impurities originating from raw materials used for producing the polycarbonate, and other foreign matters which have entered the polycarbonate during the production process. These metals are present in the polycarbonate in the form of ions, salts or complexes with an inorganic compound, salts or complexes with an organic compound. In the present invention, the form of alkali metals and alkaline earth metals present in the polycarbonate is not specifically limited. The measurement of the amount of these metals in the polycarbonate composition can be conducted using a measuring method in which the polycarbonate is subjected to ashing treatment to obtain an ash, and the content of these metals in the obtained ash is measured by atomic absorption spectrometry. When the amount of at least one metal (b) is larger than the above-mentioned range of not more than 800 ppb by weight, not only does occurrence of crazing after the polycarbonate experiences moist heat increase, especially when it has been recycled, but also the molecular weight of the polycarbonate is largely decreased when the polycarbonate composition experiences moist heat. Further, deposition of black spots or the like markedly occurs in the molded articles when a continuous molding is interrupted and restarted. It is preferred that the amount of at least one metal (b) be not more than 400 ppb by weight, more preferably not more than 200 ppb by weight. When the amount of at least one metal (b) is too small, for example, less than 1 ppb by weight, occurrence of crazing in the molded articles tends to be increased.

Examples of aromatic monohydroxy compound (c) include an aromatic monohydroxy compound by-produced in the polycondensation reaction for producing the polycarbonate, and an aromatic monohydroxy compound added to the reaction system as a molecular weight modifier or as an agent for forming a desired terminal group. The type of the aromatic monohydroxy compound by-produced in the polycondensation reaction is varied depending on the type of the carbonic diester used as a raw material. For example, when a diphenyl carbonate is used as the carbonic diester, phenol is by-produced. With respect to the aromatic monohydroxy compound used as a molecular weight modifier or as an agent for forming a desired terminal group, examples of such aromatic monohydroxy compounds include t-butyl phenol, t-octyl phenol, cumyl phenol, chromanyl phenol and products of substitution at nucleuses thereof. In the present invention, it is requisite that the aromatic monohydroxy compound (c) be present in an amount of not more than 200 ppm by weight, based on the total weight of components (a), (b), (c) and (d). When the amount of component (c) is larger than 200 ppm by weight, problems arise not only in that occurrence of crazing after exposure of the polycarbonate composition to moist heat, especially when it has been recycled, increases, but also in that a continuous injection molding has to be frequently interrupted for cleaning the mold and, in addition, occurrence of deposition of black spots or the like in the molded articles after the restart of the injection molding increases. It is preferred that the amount of the aromatic monohydroxy compound (c) be not more than 150 ppm by weight, more preferably not more than 90 ppm by weight. When the amount of the aromatic monohydroxy compound (c) is too small, for example, less than 1 ppm by weight, the moldability tends to be low and occurrence of crazing tends to increase.

The amount of component (d) (i.e., at least one member selected from the group consisting of an aromatic dihydroxy compound/carbonic diester transesterification oligomer having a weight average molecular weight of 1,000 or less, and a residual monomer selected from the aromatic dihydroxy compound and the carbonic diester and a mixture thereof) is influenced by the molecular weight of the polycarbonate, the amount of the aromatic monohydroxy compound used as a molecular weight modifier or as an agent for forming a desired terminal group, the production method for the polycarbonate, the production conditions for the polycarbonate and the like. In the present invention, it is requisite that component (d) be present in an amount of not more than $T_2\%$ by weight, based on the total weight of components (a), (b), (c) and (d), wherein $T_2$ is as defined above. When the amount of component (d) is larger than $T_2\%$ by weight, problems arise not only in that occurrence of crazing after exposure of the polycarbonate composition to moist heat, especially when it has been recycled, increases, but also in that a continuous injection molding has to be frequently interrupted for cleaning the mold and, in addition, occurrence of deposition of black spots or the like in the molded articles after the restart of the injection molding increases. From the viewpoint of good moldability of the polycarbonate composition, it is preferred that the amount of component (d) be from $T_1$ to $T_2\%$ by weight, wherein $T_1$ is defined by the following formula:

$$T_1=1{,}130{,}000\times(\text{weight average molecular weight of the polycarbonate})^{-1.60},$$

and $T_2$ is as defined above.

The polycarbonate (a) of the polycarbonate composition of the present invention is produced from an aromatic dihydroxy compound and a carbonic diester by transesterification therebetween. The transesterification is conducted while heating in the presence or absence of a catalyst under reduced pressure or under an inert gas flow. The mode of the transesterification process, the polymerization equipment and the like are not specifically limited.

Examples of reactors employable for performing the transesterification reaction include an agitation type reactor vessel, a wiped film type reactor, a centrifugal wiped film evaporation type reactor, a surface renewal type twin-screw kneading reactor, a twin-screw horizontal agitation type reactor, a wall-wetting fall reactor, a free-wall reactor having a perforated plate, and a wire-wetting fall reactor having a perforated plate and at least one wire. These various types of reactors can be used individually or in combination.

In a wall-wetting fall polymerization using a wall-wetting fall reactor, at least one polymerizing material selected from the group consisting of:

a molten monomer mixture of an aromatic dihydroxy compound and a carbonic diester, and a molten prepolymer obtained by reacting an aromatic dihydroxy compound with a carbonic diester, is fed in a molten state to an upper portion of a wall extending downwardly through a wall-wetting fall polymerization reaction zone, and allowed to fall along and in contact with the surface of the wall, thereby effecting the polymerization during the wall-wetting fall thereof.

In a free-fall polymerization using a free-fall reactor, the same polymerizing material as mentioned above is fed in a molten state to a feeding zone having a perforated plate and allowed to pass downwardly through the perforated plate and fall freely through a free-fall polymerization reaction zone, thereby effecting the polymerization during the free-fall.

In a wire-wetting fall polymerization using a wire-wetting fall reactor, the same polymerizing material as mentioned above is fed in a molten state to a feeding zone having a perforated plate and allowed to pass downwardly through the perforated plate and fall along and in contact with a wire through a wire-wetting fall polymerization reaction zone, thereby effecting polymerization of the polymerizing material during the wire-wetting fall thereof.

The perforated plate to be used in a wire-wetting fall polymerization has at least one hole. The feeding zone in the wire-wetting fall reactor communicates, through the hole, with a polymerization zone comprising a wire-wetting fall polymerization reaction zone. The wire-wetting fall polymerization reaction zone has at least one wire in correspondence with the hole, and the wire is securely held at one end thereof in an upper end portion of the wire-wetting fall polymerization reaction zone and extends downwardly through the wire-wetting fall polymerization reaction zone.

With respect to the positional relationship between the at least one wire and the perforated plate, and to the positional relationship between the at least one wire and the at least one hole of the perforated plate, there is no particular limitation as long as a polymerizing material fed to the feeding zone is enabled to pass downwardly through the perforated plate and fall along and in contact with the at least one wire toward the lower end of the at least one wire. The wire and perforated plate either may be or may not be in contact with each other.

FIGS. 2 to 4 respectively show three examples of manners in which the wire is provided in correspondence with the hole of the perforated plate.

In FIG. 2, the upper end of wire 104 is secured to support rod 123 provided above perforated plate 103, and wire 104 extends downwardly through hole 121 of perforated plate 103. Wire 104 and support rod 123 are secured to each other at fixation point 122. It is possible that support rod 123 be omitted and the upper end of wire 104 be connected, for example, to the upper inner wall surface (not shown) of the wire-wetting fall reactor.

In FIG. 3, the upper end of wire 104 is secured to the upper circumferential edge of hole 121 of perforated plate 103 at fixation point 122, and wire 104 extends downwardly through hole 121 of perforated plate 103.

In FIG. 4, the upper end of wire 104 is secured to the lower surface of perforated plate 103 at fixation point 122, and wire 104 extends downwardly from the lower surface of perforated plate 103.

Alternatively, the upper end of wire 104 may be positioned below hole 121 of perforated plate 103. In such a case, a polymerizing material which has passed downwardly through perforated plate 103 may freely fall before falling along and in contact with wire 104 toward the lower end of wire 104. This embodiment (in which a wire-wetting fall is immediately preceded by a free fall) is enabled, for example, by a method in which a wire is attached to a support rod as shown in FIG. 2, and support rod 123 having wire 104 attached thereto is provided not at a position above perforated plate 103 as shown in FIG. 2, but at a position below perforated plate 103.

Further, the wire-wetting fall polymerization may be followed by a free-fall polymerization wherein a wire-wetting fall polymerized product is consecutively allowed to fall freely through a free-fall polymerization reaction zone after leaving the lower end of the wire, the free-fall polymerization reaction zone being provided downstream of and contiguously to the wire-wetting fall polymerization reaction zone.

The transesterification reaction can be performed by either molten-state polymerization or solid-state polymerization. Further, for example, the transesterification reaction can also be performed by a method in which a molten-state transesterification is first conducted to obtain a prepolymer, and then the obtained prepolymer is subjected to solid-state polymerization under reduced pressure or under an inert gas flow, thereby elevating the polymerization degree.

The temperature for conducting the transesterification is not specifically limited; however, the temperature is generally selected in the range of from 50° C. to 350° C., preferably from 100° C. to 300° C. In general, when the transesterification reaction temperature is higher than the above-mentioned range, the final polycarbonate exhibits marked discoloration and poor thermal stability. In general, when the transesterification reaction temperature is lower than the above-mentioned range, the reaction rate becomes low, so that the reaction becomes impractical. A suitable reaction pressure is selected depending on the molecular weight of the polycarbonate in the reaction system. When the number average molecular weight of the polycarbonate in the reaction system is less than 1,000, a reaction pressure in the range of from 50 mmHg to atmospheric pressure is generally employed. When the number average molecular weight of the polycarbonate in the reaction system is in the range of from 1,000 to 2,000, a reaction pressure in the range of from 3 mmHg to 80 mmHg is generally employed. When the number average molecular weight of the polycarbonate in the reaction system is more than 2,000, a reaction pressure in the range of from 10 mmHg or less, preferably 5 mmHg or less is generally employed.

For obtaining the polycarbonate composition of the present invention, which is substantially free from occurrence of crazing and other unfavorable phenomena, such as depositing of black spots, it is preferred that the polymerization be conducted at a temperature of 280° C. or lower, more preferably 270° C. or lower. When the polymerization temperature is higher than 280° C., the amounts of an aromatic monohydroxy compound and an olygomer having a weight average molecular weight of 1,000 or less are likely to increase. Among the above-mentioned polymerization apparatuses and modes of the transesterification, a surface renewal type twin-screw kneading reactor, a twin-screw horizontal agitation type reactor, a free-fall reactor having a perforated plate, and a wire-wetting fall reactor having a perforated plate and at least one wire, and solid state polymerization method are preferred because the polymerization can be carried out efficiently at a polymerization temperature of 280° C. or lower. Especially preferred are a free-fall reactor having a perforated plate, and a wire-wetting fall reactor having a perforated plate and at least one wire, and solid-state polymerization method.

The polycarbonate composition of the present invention can be obtained by producing a polycarbonate in a manner such that the amounts of components (b), (c) and (d) as trace substances contained in the produced polycarbonate are, respectively, in the above-mentioned specific ranges defined in the present invention. When the polycarbonate contains components (b), (c) and (d) as trace substances in amounts larger than the amount ranges defined in the present invention, the polycarbonate composition of the present invention can be obtained by reducing the amounts of components (b), (c) and (d) as trace substances in the polycarbonate so as to adjust the amounts of components (b), (c) and (d) to a level within the ranges defined in the present invention. Examples of methods for reducing the amounts of the trace substances include a method in which the polycarbonate is dissolved in a good solvent therefor and subjected to filtration to obtain a filtrate, and then, the polycarbonate is precipitated by adding a poor solvent therefor to the filtrate; a method in which the trace substances are extracted with a solvent, such as acetone, which can dissolve the trace substances but cannot dissolve a polycarbonate; a method in which the trace substances are distilled off under high vacuum in the presence or absence of a solvent for entraining the trace substances; a method in which the polycarbonate is dried at a temperature at which the polycarbonate is not melted and under vacuum or atmospheric pressure.

The polymerization by the transesterification process may be carried out in the absence of a catalyst. However, when it is desired to accelerate the polymerization rate, the polymerization can be effected in the presence of a catalyst. The polymerization catalysts which are customarily used in the art can be used without particular limitations. Examples of such catalysts include hydroxides of an alkali metal and of an alkaline earth metal, such as lithium hydroxide, sodium hydroxide, potassium hydroxide and calcium hydroxide; alkali metal salts, alkaline earth metal salts and quaternary ammonium salts of boron hydride and of aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO—Ar—OLi wherein Ar represents an aryl group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula $(R^1 R^2 R^3 R^4)NB(R^1 R^2 R^3 R^4)$ wherein $R^1, R^2, R^3$ and $R^4$ are as defined above, and phosphonium borates represented by the formula $(R^1 R^2 R^3 R^4)PB(R^1 R^2 R^3 R^4)$ wherein $R^1, R^2, R^3$ and $R^4$ are as defined above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxides; and zirconium compounds, such as zirconium acetate, zirconium oxide, zirconium alkoxides, zirconium aryloxides and zirconium acetylacetone.

These catalysts can be used individually or in combination. The amount of the catalyst to be used is generally in the range of from $10^{-8}$ to 1% by weight, preferably from $10^{-7}$ to $10^{-1}$% by weight, based on the weight of the aromatic dihydroxy compound used as a raw material. When a catalyst comprising an alkali and/or alkaline earth metal is employed and the catalyst residue is not removed after the polymerization, it is preferred that a catalyst comprising an alkali and/or alkaline earth metal be used in an amount such that the polycarbonate produced by the polymerization contains at least one metal selected from the alkali metal and alkaline earth metal in an amount of not more than 800 ppb by weight, based on the total weight of the components (a), (b), (c) and (d).

With respect to the thermal stabilizers used in the present invention, there is no particular limitation as long as they can be used in a polycarbonate. For example, a phosphorus stabilizer, a phenolic antioxidant, a sulfur stabilizer, an epoxy stabilizer and a hindered amine stabilizer can be used in the present invention.

Examples of phosphorus stabilizers include phosphorus-containing acids, phosphorous esters, phosphinic esters, phosphoric esters and phosphonic esters. Representative examples of phosphorus-containing acids include phosphoric acid, phosphorous acid, hypophosphorous acid, pyrophosphoric acid, polyphosphoric acid, phosphinic acids represented by the following formula (1):

and phosphonic acids represented by the following formula (2):

wherein $R^{11}$ represents an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-t-butylphenyl group, a 2,4-di-t-butylphenyl group, a 2,6-di-t-butylphenyl group, a paranonylphenyl group and a dinonylphenyl group.

More specific examples of phosphinic acids include phenylphosphonic acid. These compounds can be used individually or in combination.

Examples of phosphorous esters include a phosphorous triester, a phosphorous diester and a phosphorous monoester which are, respectively, represented by the following formulae (3) to (6):

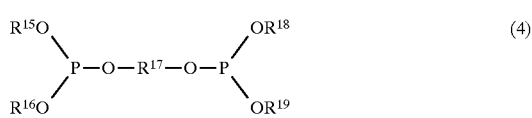

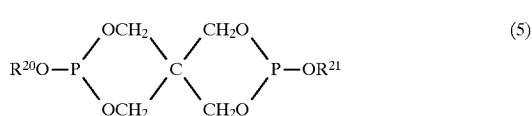

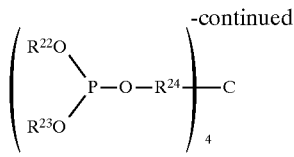

(6)

wherein each of $R^{12}$, $R^{13}$, $R^{14}$, $R^{15}$, $R^{16}$, $R^{18}$, $R^{19}$, $R^{20}$, $R^{21}$, $R^{22}$ and $R^{23}$ independently represents a hydrogen atom; an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; an alkylaryl group, such as a tolyl group, a p-t-butylphenyl group, a 2,4-di-t-butylphenyl group, a 2,6-di-t-butylphenyl group, a paranonylphenyl group and a dinonylphenyl group; and each of $R^{17}$ and $R^{24}$ independently represents alkylene, allylene or arylalkylene.

Specific examples of phosphorous triesters include tris(2,4-di-t-butylphenyl)phosphite, tris(nonylphenyl)phosphite, tris(dinonylphenyl)phosphite, triphenyl phosphite, tetraphenyldipropylene glycol phosphite, tetra(tridecyl)4,4'-isopropylidene diphenyldiphosphite, bis(tridecyl) pentaerythritol diphosphite, bis(nonylphenyl)pentaerythritol diphosphite, bis(2,4-di-t-butylphenyl)pentaerythritol diphosphite, bis(2,6-di-t-butyl-4-methylphenyl) pentaerythritol diphosphite, distearyl, pentaerythritol diphosphite, hydrogenated bisphenol A pentaerythritol phosphite polymer and tetraphenyltetra(tridecyl)pentaerythritol tetraphosphite. Among these compounds, phosphorous triesters having a 2,4-di-t-butylphenyl group or a 2,6-di-t-butylphenyl group are especially preferred, and specific examples of such especially preferred phosphorous triesters include tris(2,4-di-t-butylphenyl) phosphite, bis(2,4-di-t-butylphenyl)pentaerythritol diphosphite and bis(2,6-di-t-butyl-4-methylphenyl)pentaerythritol diphosphite.

Preferred examples of phosphorous diesters include aromatic phosphorous diesters. Examples of aromatic phosphorous diesters include diphenyl hydrogen phosphite, bis(nonylphenyl) hydrogen phosphite, bis(2,4-di-t-butylphenyl) hydrogen phosphite, dicresyl hydrogen phosphite, bis(p-t-butylphenyl) hydrogen phosphite and bis(p-hexylphenyl) hydrogen phosphite.

Specific examples of phosphorous monoesters include phenyl dihydrogen phosphite, nonylphenyl dihydrogen phosphite and 2,4-di-t-butylphenyl dihydrogen phosphite. These compounds can be used individually or in combination.

Examples of phosphinic esters include phosphinic monoesters and phosphinic diesters represented by the following formulae (7) and (8):

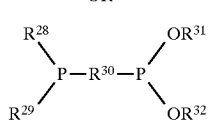

(7)

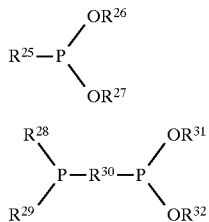

(8)

wherein $R^{25}$ represents an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; and an alkylaryl group, such as a tolyl group, a p-t-butylphenyl group, a 2,4-di-t-butylphenyl group, a 2,6-di-t-butylphenyl group, a paranonylphenyl group and a dinonylphenyl group; and each of $R^{26}$, $R^{27}$, $R^{28}$, $R^{29}$, $R^{31}$ and $R^{32}$ independently represents a hydrogen atom; an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; and an alkylaryl group, such as a tolyl group, a p-t-butylphenyl group, a 2,4-di-t-butylphenyl group, a 2,6-di-t-butylphenyl group, a paranonylphenyl group and a dinonylphenyl group; and $R^{30}$ represents alkylene, allylene or arylalkylene.

A representative example of these compounds is tetra-kis(2,4-di-t-butylphenyl) 4,4'-biphenylene diphosphinate. These compounds can be used individually or in combination.

Examples of phosphoric esters include a phosphoric diester and a phosphoric monoester, which are represented by the following formulae (9) to (12):

(9)

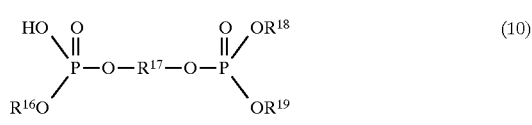

(10)

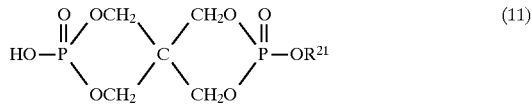

(11)

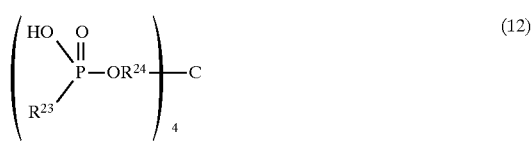

(12)

wherein $R^{13}$, $R^{14}$, $R^{16}$, $R^{17}$, $R^{18}$, $R^{19}$, $R^{21}$, $R^{23}$ and $R^{24}$ are as defined above.

Specific examples of phosphoric diesters include diphenylhydrogen phosphate, bis(nonylphenyl) hydrogen phosphate, bis(2,4-di-t-butylphenyl) hydrogen phosphate, dicresyl hydrogen phosphate, bis(p-t-butylphenyl) hydrogen phosphate and bis(p-hexylphenyl) hydrogen phosphate.

Specific examples of phosphoric monoesters include phenyl dihydrogen phosphate, nonylphenyl dihydrogen phosphate and 2,4-di-t-butylphenyl dihydrogen phophate.

These compounds can be used individually or in combination.

Examples of phosphonic esters include phosphonic monoester represented by the following formulae (13) and (14):

(13)

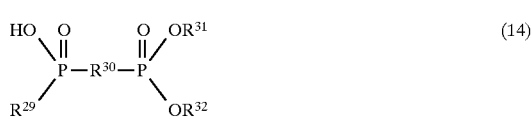

(14)

wherein $R^{25}$, $R^{27}$, $R^{29}$, $R^{30}$, $R^{31}$ and $R^{32}$ are as defined above.

The phenolic antioxidant is represented by the following formula (15):

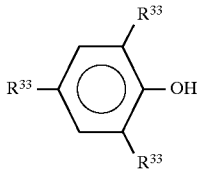
(15)

wherein each of $R^{33}$s independently represents a hydrogen atom, a hydroxyl group, an alkoxyl group, or an unsubstituted or substituted hydrocarbon residue, with the proviso that at least one of $R^{33}$s represents an unsubstituted or substituted hydrocarbon residue.

Specific examples of the above-mentioned phenolic antioxidants include 2,6-di-t-butyl-p-cresol, 2,6-di-t-butyl-p-anisole, 2,6-di-t-butyl-4-ethylphenol, 2,2'-methylene bis(6-t-butyl-p-cresol), 2,2'-methylene bis(4-ethyl-6-t-butyl-p-phenol), 4,4'-methylene bis(6-t-butyl-p-cresol), 4,4'-butylidene bis(6-t-butyl-m-cresol), tetrakis[methylene-3-(3', 5'-di-t-butyl-4'-hydroxyphenyl)propyonate]methane, 4,4'-thio bis(6-t-butyl-m-cresol), stearyl-β-(3,5-di-t-buty-4-hydroxyphenyl)propionate, 1,3,5-trimethyl-2,4,6-tris(3,5-di-t-butyl-4-hydroxybenzyl)benzene, 1,1,3-tris(2-methyl-4-hydroxy-5-t-butylphenyl)butane and triethylene glycolbis[3-(3-t-butyl-5-methyl-4-hydroxyphenyl)propionate].

A preferable phenolic antioxidant is represented by the following formula (16):

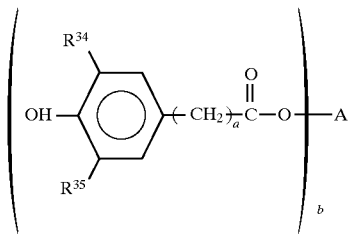
(16)

wherein $R^{34}$ represents a methyl group or a t-butyl group, $R^{35}$ represents a t-butyl group, A represents a $C_1$–$C_{30}$ hydrocarbon residue or a $C_1$–$C_{30}$ heterocyclic residue having a valence of b, a represents an integer of from 1 to 4 and b represent an integer of 1 or more.

Specific examples of the above-mentioned phenolic antioxidants include tetrakis[methylene-3-(3',5'-di-t-butyl-4'-hydroxyphenyl)propionate]methane, stearyl-β-(3,5-di-t-butyl-4-hydroxyphenyl)propionate and triethylene glycol-bis[3-(3-t-butyl-5-methyl-4-hydroxyphenyl)propionate].

Further examples of phenolic antioxidants include a phenolic antioxidant containing phosphorus atom, such as 3,5-di-t-butyl-4-hydroxybenzyl phosphonate diethyl ester and calcium bis(3,5-di-t-butyl-4-hydroxybenzyl ethylphosphonate).

These phenolic antioxidants can be used individually or in combination.

Examples of sulfur stabilizers include a sulfinic acid represented by the formula $R^{36}$—$SO_2$—$R^{37}$, a sulfonic acid represented by the formula $R^{36}$—$SO_3$—$R^{37}$, (in each of these equations, $R^{36}$ is equivalent to $R^{11}$ and $R^{37}$ is equivalent to $R^{12}$), esters thereof, and thioether compounds represented by the following formula (17):

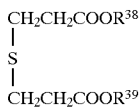
(17)

wherein each of $R^{38}$ and $R^{39}$ independently represents a $C_{12}$–$C_{18}$ alkyl group.

Specific examples of the above-mentioned sulfur stabilizers include benzenesulfinic acid, p-toluenesulfinic acid, benzenesulfonic acid, p-toluenesulfonic acid, naphthalenesulfonic acid, and a methyl, an ethyl, a butyl, an octyl and a phenylester thereof. Further examples include dilauryl-3,3'-thiodipropionate, ditridecyl-3,3'-thiodipropionate, dimyristyl-3,3'-thiodipropionate, distearyl-3,3'-thiodipropionate and pentaerythritol(β-laurylthiopropinate). These sulfur stabilizers can be used individually or in combination.

Examples of epoxy stabilizers include epoxy-containing fats and oils, such as epoxidated soybean oil and epoxidated linseed oil; glycidyl compounds, such as phenylglycidyl ether, allylglycidyl ether, t-butylphenylglycidyl ether, bisphenol A diglycidyl ether, tetrabromo bisphenol A diglycidyl ether, diglycidyl phthalate, diglycidyl hexahydrophthalate; epoxycyclohexane compounds, such as 3,4-epoxycyclohexylmethyl-3,4-epoxycyclohexane carboxylate, 3,4-epoxy-6-methylcyclohexylmethyl-3,4-epoxycyclohexane carboxylate, 2,3-epoxycyclohexylmethyl-3,4-epoxycyclohexane carboxylate, 4-(3,4-epoxy-5-methylcyclohexyl)butyl-3,4epoxycyclohexane carboxylate, 3,4-epoxycyclohexylethylene oxide, cyclohexylmethyl-3,4-epoxycyclohexane carboxylate, 3,4-epoxy-6-methylcyclohexylmethyl-6-methylcyclohexane carboxylate, bisepoxycyclohexyl adipate, octadecyl-2,2'-dimethyl-3,4-epoxycyclohexane carboxylate, N-butyl-2,2'-dimethyl-3,4-epoxycyclohexane carboxylate, cyclohexyl-2-methyl-3,4-epoxycyclohexane carboxylate, N-butyl-2-isopropyl-3,4-epoxy-5-methylcyclohexane carboxylate, octadecyl-3,4-epoxycyclohexane carboxylate, 2-ethylhexyl-3,4-epoxycyclohexane carboxylate, 4,6-dimethyl-2,3-epoxycyclohexyl-3,4-epoxycyclohexane carboxylate, diethyl-4,5-epoxy-cis-1,2-cyclohexane carboxylate, di-n-butyl-3-t-butyl-4,5-epoxy-cis-1,2-cyclohexane carboxylate, 3,4-dimethyl-1,2-epoxycyclohexane, 3,5-dimethyl-1,2-epoxycyclohexane and 3-methyl-5-t-butyl-1,2-epoxycyclohexane; bisepoxydicyclopentadienyl ether; butadiene diepoxide; tetraphenylethylene epoxide; epoxidated polybutadiene; 4,5-epoxytetrahydrophthalic anhydride; and 3-t-butyl-4,5-epoxytetrahydrophthalic anhydride. These epoxy stabilizers can be used individually or in combination.

Examples of hindered amine stabilizers include bis(2,2,6,6-tetramethyl-4-piperidyl)sebacate, bis(1,2,6,6-pentamethyl-4-piperidyl)sebacate, 2-(3,5-di-t-butyl-4-hydroxybenzyl)-2-n-butylmalonate bis(1,2,2,6,6-pentamethyl-4-piperidyl)tetraxy(2,2,6,6-tetramethyl-4-piperidyl)1,2,3,4-butane tetracarboxylate, 1-[2-{3-(3,5-di-t-butyl-4-hydroxyphenyl)propionyloxy}ethyl]-4-{3-(3,5-di-t-butyl-4-hydroxyphenyl)propionyloxy}-2,2,6,6-tetramethylpiperidine, 8-benzyl-7,7,9,9-tetramethyl-3-octhyl-1,2,3-triazaspiro{4,5}undecane-2,4-dione and 4-benzoyloxy-2,2,6,6-tetramethylpiperidine. These hindered amine stabilizers can be used individually or in combination.

These thermal stabilizers may be used individually or in combination. Among them, a phosphorus stabilizer having an active hydrogen group, a sulfur stabilizer having an active hydrogen group, a sulfinic ester and a sulfonic ester are preferred. As mentioned above, examples of phosphorus stabilizers having an active hydrogen group include a phosphoric acid, a phosphinic acid, a phosphonic acid, a phosphorous monoester, a phosphorous diester, a phosphinic monoester, a phosphoric monoester, a phosphoric diester and a phosphonic monoester, and examples of sulfur stabilizers having an active hydrogen group include a sulfinic acid and a sulfonic acid. Among them, a phosphorus stabilizer having an active hydrogen group, especially a phosphorous monoester and a phosphorous diester are preferred, because the use thereof effectively suppresses the generation of black spots. The amount of the thermal stabilizer to be added to the polycarbonate composition is not specifically limited, however, the thermal stabilizer is generally used in an amount of from 0.0005 to 0.22 part by weight, relative to 100 parts by weight of the total of components (a), (b), (c) and (d). In the case of adding a phosphorous diester or a phosphorous monoester as a thermal stabilizer, it is used in an amount of preferably from 0.0005 to 0.015 part by weight, more preferably from 0.0005 to 0.009 part by weight, relative to 100 parts by weight of the total of components (a), (b), (c) and (d).

When the above-mentioned thermal stabilizers are used in combination, the combination of the thermal stabilizers is not specifically limited. However, preferred is a combination of at least one member selected from the group consisting of the above-mentioned phosphorus stabilizer having an active hydrogen group, sulfur stabilizer having an active hydrogen group, sulfinic ester and sulfonic ester, with at least one member selected from the group consisting of another type of phosphorus stabilizer, and another type of sulfur stabilizer, a phenolic antioxidant, an epoxy stabilizer and a hindered amine stabilizer. Among them, especially preferred is a combination of at least one member selected from the group consisting of a phosphorus stabilizer having an active hydrogen group, a sulfur stabilizer having an active hydrogen group, a sulfinic ester and a sulfonic ester, particularly at least one member selected from the group consisting of a phosphorous diester and a phosphorous monoester, with at least one member selected from the group consisting of a phosphorous triester, a phosphinic diester and a phenolic antioxidant. By using these stabilizers, not only can the occurrence of black spots be suppressed, but also the discoloration resistance and long-term thermal aging resistance (which are desirable properties of a polycarbonate composition) can be improved, especially when it has been recycled. The amounts of these stabilizers used are not specifically limited. However, when use is made of a thermal stabilizer comprising at least one member selected from the group consisting of a phosphorus stabilizer having an active hydrogen group, a sulfur stabilizer having an active hydrogen group, a sulfinic ester and a sulfonic ester, the thermal stabilizer is generally used in an amount of from 0.0005 to 0.015 part by weight, preferably from 0.0005 to 0.009 part by weight, relative to 100 parts by weight of the total of components (a), (b), (c) and (d). When the above stabilizer is used in combination with other stabilizers as mentioned above, the other stabilizer is generally used in an amount of from 0.0005 to 0.1 part by weight, preferably from 0.0005 to 0.07 part by weight, more preferably from 0.001 to 0.05 part by weight, relative to 100 parts by weight of the total of components (a), (b), (c) and (d).

The polycarbonate composition of the present invention may comprise additives as long as the advantages of the polycarbonate composition of the present invention are not spoiled. Examples of additives include a thermal stabilizer and antioxidant other than the above-mentioned thermal stabilizers and antioxidants, a weathering stabilizer, a mold release agent, a lubricant, an antistatic agent, a plasticizer, a resin other than a polycarbonate or a polymer such as a rubber, a pigment, a dye, a filler, a reinforcing agent, and a flame retardant. These additives can be used in amounts such as used for a conventional polycarbonate.

The above-mentioned additives, such as a thermal stabilizer, can be mixed with the polycarbonate composition of the present invention in the same manner as in conventional methods for mixing the additives with a polycarbonate composition, however, there is no particular limitation with respect to the method for mixing the additives with the polycarbonate composition of the present invention. Examples of methods for mixing the additives with the polycarbonate composition of the present invention include a method in which the additives are mixed with the polycarbonate composition using a Henschel mixer, a super mixer, a tumbling mixer, a ribbon blender or the like, and the resultant mixture is subjected to melt-kneading using a singlescrew extruder, a twin-screw extruder, a Banbury mixer or the like; or a method in which the additives are mixed with the polycarbonate composition of the present invention in a molten state using a mixing tank, a static mixer, a single-screw, twin-screw or multi-screw extruder or the like.

As mentioned above, the polycarbonate composition of the present invention has an advantage in that it is substantially free from occurrence of crazing, even when experiences moist heat, and especially even when it has been recycled. Therefore, the polycarbonate composition of the present invention can be advantageously used as materials for medical and food-related equipments and appliances, which need to be frequently sterilized with steam or boiling water, and as materials for optical and electronic equipments, for example, an optical disc which needs to be stable when experiences moist heat. The polycarbonate composition of the present invention is also advantageous in that, when it is continuously injection-molded, the molding can be carried out with less necessity of interruption for mold cleaning, and that, even when the continuous molding is interrupted for mold cleaning or other reasons and then restarted, occurrence of unfavorable phenomena, such as deposition of black spots (carbonized material waste), and development of brown streaks, uneven color and the like, can be effectively suppressed, which unfavorable phenomena have conventionally been observed when a continuous molding is interrupted and restarted. Further, the polycarbonate composition of the present invention has excellent discoloration resistance and excellent thermal resistance. Therefore, the polycarbonate composition of the present invention can be advantageously used in various fields in which the appearance of a product produced from the polycarbonate composition is required to be excellent, such as a field in which the polycarbonate composition is injection-molded to produce a molded article.

BEST MODE FOR CARRYING OUT THE INVENTION

Hereinbelow, the present invention will be described in more detail with reference to the following Examples and Comparative Examples, but they should not be construed as limiting the scope of the present invention.

In the following Examples and Comparative Examples, various properties were measured as follows.

(1) Measurement of the content of an alkali metal and/or an alkaline earth metal:

A polycarbonate was subjected to cold ashing treatment using PLASMA ASHER (LTA-102, manufactured and sold by YANAGIMOTO MFG.CO.LTD., Japan) and the content of an alkali metal and/or an alkaline earth metal in the resultant polycarbonate was measured using Flameless Atomic Absorption Spectrophotometer (Z-9000, manufactured and sold by Hitachi Ltd., Japan).

(2) Measurement of the content of an aromatic monohydroxy compound:

The content of an aromatic monohydroxy compound was measured by high performance liquid chromatography (HPLC).

(3) Measurement of the weight average molecular weight of a polycarbonate, and measurement of the content of an oligomer having a weight average molecular weight of 1,000 or less and/or a residual monomer:

The weight average molecular weight of a polycarbonate and the content of an oligomer having a weight average molecular weight of 1,000 or less and/or a residual monomer were individually measured by gel permeation chromatography (GPC) (column: TSK-GEL, manufactured and sold by Tosoh Corp., Japan, solvent: THF).

(4) Determination of the terminal hydroxyl group content of a polycarbonate:

The total molar amount of all terminal groups of a polycarbonate and the molar amount of terminal hydroxyl groups of the polycarbonate were individually measured by NMR. The molar ratio of terminal hydroxyl groups to all terminal groups was determined by the following formula:

$$\text{Terminal hydroxyl group content(mol \%)} = \frac{\text{Amount of terminal hydroxyl groups(mol)}}{\text{Total amount of all terminal groups(mol)}} \times 100.$$

(5) Evaluation of crazing-preventive properties of a polycarbonate composition:

A polycarbonate composition was subjected to molding by using an injection molding machine (J100E, manufactured and sold by THE JAPAN STEEL WORKS. LTD., Japan) at a cylinder temperature of 300° C. and a mold temperature of 90° C. to obtain strip-shaped, molded articles, each having a thickness of 3 mm, a width of 20 mm and a length of 20 cm. Five of the strips were immersed in water at 95° C. for 300 hours and then, allowed to stand in a room, which had been adjusted to a temperature of 23° C. and a humidity of 50 RH%, for 24 hours. After that period of time, the total number of visually observed crazes (having an average diameter of from about 50 to 1,000 $\mu$m) of the five strips was counted.

Evaluation of crazing-preventive properties of a recycled polycarbonate composition was made in accordance with the same methods as mentioned above, using a molded article which had been obtained by crushing the above-mentioned molded article into particles and subjecting the obtained particles to molding again.

(6) Evaluation of continuous-molding properties:

A polycarbonate composition was subjected to continuous molding, using an injection molding machine (J100E, manufactured and sold by THE JAPAN STEEL WORKS. LTD., Japan) after mold cleaning, at a cylinder temperature of 300° C. and a mold temperature of 90° C. to thereby obtain box-shaped, molded articles, each having a wall thickness of 2 mm, a width of 100 mm, a length of 100 mm and a height of 50 mm. The number of molding shots was counted at the time when the mold release characteristics of the composition became so poor that mold cleaning became necessary.

(7) Evaluation of properties of a polycarbonate composition after a continuous molding has been interrupted and restarted:

A polycarbonate composition was subjected to continuous molding by using an injection molding machine (J100E, manufactured and sold by THE JAPAN STEEL WORKS. LTD., Japan), which had been disassembled and cleaned, at a cylinder temperature of 300° C. and a mold temperature of 90° C. for 10 days, to obtain box-shaped, molded articles, each having a wall thickness of 2 mm, a width of 100 mm, a length of 100 mm and a height of 50 mm. Using the molded boxes obtained, various properties of the polycarbonate composition were evaluated as follows.

i) The number of black spots:

For mold cleaning the continuous molding was interrupted for 1 hour. After completion of the mold cleaning, a continuous molding was restarted in substantially the same manner as mentioned above. With respect to the molded box obtained at the first molding shot after the restart of continuous molding, the number of appearing black spots having a diameter of about 50 $\mu$m or more was counted.

ii) The number of molding shots before obtaining an excellent article:

The average color tone with respect to 10 molded boxes obtained immediately before the interruption of a continuous molding was determined. A continuous molding was restarted, and the number of molding shots (necessary for successively obtaining two boxes which were free of black spots and exhibited not only no local uneven color or brown streaks but also exhibited no significant difference in color tone from the abovementioned 10 molded boxes) was counted.

EXAMPLE 1

A polycarbonate composition was produced by melt transesterification in accordance with a system as shown in FIG. 1. The system of FIG. 1 comprises first stage and second stage agitation polymerizations, and first stage and second stage wire-wetting fall polymerizations.

In the first stage wire-wetting fall polymerization, first wire-wetting fall polymerizer 110A was used. In the second stage wire-wetting fall polymerization, second wire-wetting fall polymerizer 110B was used. Each of the first and second wire-wetting fall polymerizers is equipped with a perforated plate which has 50 holes having a diameter of 7.5 mm and arranged in a zigzag configuration. In each of the first and second wire-wetting fall polymerizers, 50 strands of 1 mmø SUS 316 L wires are hung vertically from the respective holes of the perforated plate to a reservoir portion at the bottom of the wire-wetting fall polymerizer 110 so that a polymerizing material will not fall freely (not free-fall) but fall along and in contact with the wires (wire-wetting fall). Illustratively stated, as shown in FIG. 2, each wire 104 is secured at the upper end thereof to support rod 123 provided above perforated plate 103, and extends downwardly through hole 121 of perforated plate 103. In each of the first and second wire-wetting fall polymerizers, the wire-wetting fall distance is 4 m. Only first wire-wetting fall polymerizer 110A has a recirculation line.

The first stage agitation polymerization in first agitation type polymerizer vessels 3A and 3B, each having a capacity of 100 liters, was batchwise conducted, whereas the second stage agitation polymerization in second agitation type polymerizer vessel 3C, having a capacity of 50 liters, and the first stage and second stage wire-wetting fall polymerizations in first and second wire-wetting fall polymerizers 110A and 110B, were continuously conducted.

The polymerization reaction conditions in both of first agitation type polymerizer vessels 3A and 3B were as follows: the reaction temperature was 180° C., the reaction pressure was atmospheric pressure, and the flow rate of nitrogen gas was 1 liter/hr.

In operation, polymerizing materials [a monomer mixture of bisphenol A and diphenyl carbonate (each being substantially free of a chlorine atom) in a molar ratio of 1:1.10 and, as a catalyst, disodium salt of bisphenol A (a molar ratio of disodium salt of bisphenol A to bisphenol A in the monomer mixture was $2.8 \times 10^{-8}$:1)] were charged into each of first agitation type polymerizer vessels 3A and 3B. The monomer mixture in polymerizer 3A was polymerized in a molten state while agitating for 4 hours to obtain prepolymer 4A. Outlet 5A was opened, and prepolymer 4A was fed to second agitation type polymerizer vessel 3C, having a capacity of 50 liters, at a flow rate of 5 liters/hr.

While feeding prepolymer 4A obtained in first agitation type polymerizer vessel 3A to second agitation type polymerizer vessel 3C, first agitation type polymerizer vessel 3B was operated to polymerize the monomer mixture of bisphenol A and diphenyl carbonate in the same manner as in the agitation polymerization in first agitation type polymerizer vessel 3A, to obtain prepolymer 4B.

When first agitation type polymerizer vessel 3A became empty, outlet 5A of polymerizer 3A was closed and, instead, outlet 5B of polymerizer 3B was opened, so that prepolymer 4B was fed from first agitation type polymerizer vessel 3B to second agitation type polymerizer vessel 3C at a flow rate of 5 liters/hr. In this instance, the same polymerizing materials as mentioned above were charged in polymerizer 3A. While feeding prepolymer 4B obtained in first agitation type polymerizer vessel 3B to second agitation type polymerizer vessel 3C, polymerizer vessel 3A was operated, so that the monomer mixture charged therein was polymerized in the same manner as mentioned above.

With respect to a batchwise polymerization in first agitation type polymerizer vessels 3A and 3B and to the alternate feedings of prepolymers 4A and 4B from polymerizers 3A and 3B to second agitation type polymerizer vessel 3C, the same operation as mentioned above was repeated, so that the prepolymer (either prepolymer 4A or prepolymer 4B, alternately) was continuously fed to second agitation type polymerizer vessel 3C.

In second agitation type polymerizer vessel 3C, a further agitation polymerization of prepolymers 4A and 4B, alternately fed from first agitation type polymerizer vessels 3A and 3B, was continuously carried out under polymerization reaction conditions wherein the reaction temperature was 230° C., the reaction pressure was 100 mmHg and the flow rate of nitrogen gas was 2 liters/hr, thereby obtaining prepolymer 4C.

When the volume of prepolymer 4C in second agitation type polymerizer vessel 3C reached 20 liters, part of prepolymer 4C was continuously fed to first wire-wetting fall polymerizer 110A so that the volume of prepolymer 4C in second agitation type polymerizer vessel 3C was constantly maintained at 20 liters. The feeding of prepolymer 4C to first wire-wetting fall polymerizer 110A was conducted through inlet 101A provided in recirculation line 102A for polymerizer 110A.

In first wire-wetting fall polymerizer 110A, a wire-wetting fall polymerization of prepolymer 4C was continuously carried out under polymerization reaction conditions wherein the reaction temperature was 250° C., and the reaction pressure was 2.0 mmHg and the flow rate of nitrogen gas was 1 liter/hr, thereby obtaining prepolymer 111A, while recirculating a part of obtained prepolymer 111A to the feeding zone (having perforated plate 103A) of first wire-wetting fall polymerizer 110A through recirculation line 102A at a recirculation rate of 200 liters/hr.

When the volume of prepolymer 111A at the bottom of first wire-wetting fall polymerizer 110A reached 5 liters, part of prepolymer 111A was continuously fed to second wire-wetting fall polymerizer 110B so that the volume of prepolymer 111A in first wire-wetting fall polymerizer 110A was constantly maintained at 5 liters.

In second wire-wetting fall polymerizer 110B, a wire-wetting fall polymerization reaction was continuously carried out under polymerization reaction conditions wherein the reaction temperature was 250° C., and the reaction pressure was 1.0 mmHg and the flow rate of nitrogen gas was 1 liter/hr, thereby obtaining polycarbonate composition 111B.

When the volume of polycarbonate composition 111B at the bottom of second wire-wetting fall polymerizer 110B reached 5 liters, polycarbonate composition 111B was continuously withdrawn from second wire-wetting fall polymerizer 110B through outlet 109B by means of discharge pump 108B so that the volume of polycarbonate composition 111B in second wire-wetting fall polymerizer 110B was constantly maintained at 5 liters.

The above-mentioned series of polymerization reactions was continuously carried out for 700 hours.

The polycarbonate in the obtained composition was substantially free of chlorine atoms, and had a terminal hydroxyl group content of 7 mol %, based on the molar total of all terminal groups of the polycarbonate, and a weight average molecular weight of 22,100. Further, in the polycarbonate composition, the content of sodium (alkali metal) was 5 ppb, the content of phenol (aromatic monohydroxy compound) was 31 ppm, the content of an oligomer having a weight average molecular weight of 1,000 or less and/or a residual monomer was 0.48 wt %, $T_1$ was 0.012649, and $T_2$ was 0.843177. The polycarbonate composition was subjected to continuous injection molding, and various evaluations were made in accordance with the above-mentioned methods. Results are shown in Table 1.

100 parts by weight of the polycarbonate composition and a thermal stabilizer comprising 0.002 parts by weight of bis(nonylphenyl) hydrogen phosphite and 0.02 parts by weight of tris(2,4-tert-butylphenyl) phosphite were mixed well by means of a Henschel mixer, to thereby obtain a homogenous mixture. The obtained mixture was pelletized at 260° C. by means of an extruder. Then, the resultant pellet was subjected to continuous injection molding, and various evaluations were made in accordance with the above-mentioned methods. Results are shown in Table 2, together with the results of the measurements made with respect to the polycarbonate in the composition in accordance with the above-mentioned methods.

EXAMPLES 2 to 4

Polycarbonate compositions were obtained in substantially the same manner as in Example 1, except that the molar ratio of disodium salt of bisphenol A to bisphenol A in the monomer mixture was changed to varied molar ratios, namely, $2.8 \times 10^{-7}:1$, $5 \times 10^{-7}:1$ and $1 \times 10^{-6}:1$ in Examples 2, 3 and 4, respectively. The polycarbonate in each of the polycarbonate compositions obtained in these Examples 2, 3 and 4 was substantially free of a chlorine atom, and had a weight average molecular weight of 22,500. The polycarbonates obtained in these Examples 2, 3 and 4 had terminal hydroxyl group contents of 6 mol %, 3 mol % and 4 mol %, respectively. Further, in the polycarbonate compositions obtained in these Examples 2, 3 and 4, the contents of sodium (alkali metal) were 49 ppb, 92 ppb and 182 ppb, the contents of phenol (aromatic monohydroxy compound) were 79 ppm, 100 ppm and 113 ppm, and the contents of an oligomer having a weight average molecular weight of 1,000 or less and/or a residual monomer were 0.51 wt %, 0.72 wt % and 0.78 wt %, respectively. In each of the polycarbonate compositions obtained in these Examples 2, 3 and 4, $T_1$ was 0.012291, and $T_2$ was 0.821676. With respect to the obtained polycarbonate compositions, various evaluations were made in accordance with the above-mentioned methods. Results are shown in Table 1.

Using the polycarbonate compositions obtained in these Examples 2 to 4 individually, pellets were obtained in substantially the same manner as in Example 1. The obtained pellets were subjected to continuous injection molding, and various evaluations were made in accordance with the above-mentioned methods. Results are shown in Table 2, together with the results of the measurements made with respect to the polycarbonate in each of the compositions in accordance with the abovementioned methods.

COMPARATIVE EXAMPLE 1

A polycarbonate composition was obtained in substantially the same manner as in Example 1, except that the molar ratio of disodium salt of bisphenol A to bisphenol A was changed to $5.5 \times 10^{-6}:1$.

The polycarbonate in the obtained polycarbonate composition had a weight average molecular weight of 22,300. In the polycarbonate composition, the content of an oligomer having a weight average molecular weight of 1,000 or less and/or a residual monomer was 0.83 wt %, $T_1$ was 0.012468, and $T_2$ was 0.832309. With respect to the obtained polycarbonate composition, various evaluations were made in accordance with the above-mentioned methods. Results are shown in Table 1.

Using the obtained polycarbonate composition, a pellet was obtained in substantially the same manner as in Example 1. The obtained pellet was subjected to continuous injection molding, and various evaluations were made in accordance with the above-mentioned methods. Results are shown in Table 2, together with the results of the measurements made with respect to the polycarbonate in the composition in accordance with the above-mentioned methods.

COMPARATIVE EXAMPLE 2

A polycarbonate composition was produced by melt transesterification, using an agitation type polymerizer vessel instead of a wire-wetting fall polymerizer. The agitation type polymerizer has a capacity of 90 liters.

In operation, polymerizing materials [a monomer mixture of bisphenol A and diphenyl carbonate (each being substantially free of a chlorine atom) in a molar ratio of 1:1.08 and, as a catalyst, disodium salt of bisphenol A in the monomer mixture was $5 \times 10^{-7}:1$)] were charged into the agitation type polymerizer, and the polymerizer was purged with nitrogen gas, followed by melting of a mixture of the polymerizing materials. Subsequently, the internal temperature of the polymerizer was gradually elevated to 300° C. and the pressure in the polymerizer was gradually lowered to 0.3 mmHg. Then, a batchwise polymerization was conducted to thereby obtain a polycarbonate composition.

The polycarbonate in the obtained composition was substantially free of a chlorine atom, and had a terminal hydroxyl group content of 7 mol %, based on the molar total of all terminal groups of the polycarbonate, and a weight average molecular weight of 22,300. Further, in the polycarbonate composition, the content of sodium (alkali metal) was 102 ppb, the content of phenol (aromatic monohydroxy compound) was 220 ppm, the content of an oligomer having a weight average molecular weight of 1,000 or less and/or a residual monomer was 1.3 wt %, $T_1$ was 0.012468, and $T_2$ was 0.832309. The polycarbonate composition was subjected to continuous injection molding, and various evaluations were made in accordance with the abovementioned methods. Results are shown in Table 1.

100 parts by weight of the polycarbonate composition and a thermal stabilizer comprising 0.002 parts by weight of bis(nonylphenyl) hydrogen phosphite and 0.02 parts by weight of tris(2,4-tert-butylphenyl) phosphite were mixed well by means of a Henschel mixer, to thereby obtain a homogeneous mixture. The obtained mixture was pelletized at 260° C. by means of an extruder. Then, the resultant pellet was subjected to continuous injection molding, and various evaluations were made in accordance with the abovementioned methods. Results are shown in Table 2, together with the results of the measurements made with respect to the polycarbonate in the composition in accordance with the above-mentioned methods.

COMPARATIVE EXAMPLE 3

A polycarbonate composition was obtained in substantially the same manner as in Example 3, except that p-t-octylphenol was further used as a molecular weight modifier in an amount of 4 mol %, based on the amount of bisphenol A.

The polycarbonate in the obtained composition had a weight average molecular weight of 22,300. In the polycarbonate composition, the content of an oligomer having a weight average molecular weight of 1,000 or less and/or a residual monomer was 0.79 wt %, $T_1$ was 0.012468, and $T_2$ was 0.832309. With respect to the obtained polycarbonate composition, various evaluations were made in accordance with the above-mentioned methods. Results are shown in Table 1.

Using the obtained polycarbonate composition, a pellet was obtained in substantially the same manner as in Example 3. The pellet was subjected to continuous injection molding, and various evaluations were made in accordance with the above-mentioned methods. Results are shown in Table 2, together with the results of the measurements made with respect to the polycarbonate in the composition in accordance with the above-mentioned methods.

EXAMPLE 5

The polycarbonate composition which had been obtained in Example 2 was charged in a tumbling dryer. While introducing dried nitrogen into the dryer at a flow rate of 5 liters/hr (volume at normal temperature and pressure), the polycarbonate was subjected to vacuum drying while stirring at 130° C. under 0.5 mmHg for 24 hours, to thereby obtain a treated polycarbonate composition.

The polycarbonate in the treated polycarbonate composition was substantially free of a chlorine atom, and had a terminal hydroxyl group content of 6 mol %, based on the molar total of all terminal groups of the polycarbonate, and a weight average molecular weight of 22,500. Further, in the polycarbonate composition, the content of sodium (alkali metal) was 49 ppb, the content of phenol (aromatic monohydroxy compound) was 5 ppm, the content of an oligomer having a weight average molecular weight of 1,000 or less and/or a residual monomer was 0.42 wt %, $T_1$ was 0.012291, and $T_2$ was 0.821676. With respect to the obtained polycarbonate composition, various evaluations were made in accordance with the above-mentioned methods. Results are shown in Table 1.

100 parts by weight of the polycarbonate composition and a thermal stabilizer comprising 0.002 parts by weight of bis(nonylphenyl) hydrogen phosphite and 0.02 parts by weight of tris(2,4-tert-butylphenyl) phosphite were mixed well by means of a Henschel mixer, to thereby obtain a homogeneous mixture. The obtained mixture was pelletized at 260° C. by means of an extruder. Then, the resultant pellet was subjected to continuous injection molding, and various evaluations were made in accordance with the above-mentioned methods. Results are shown in Table 2, together with the results of the measurements made with respect to the polycarbonate in the composition in accordance with the above-mentioned methods.

EXAMPLES 6 and 7

Polycarbonate compositions were individually obtained in substantially the same manner as in Example 1, except that in Example 6, the molar ratio of bisphenol A to diphenyl carbonate was changed to 1:1.06 and the molar ratio of disodium salt of bisphenol A to bisphenol A in the monomer mixture was changed to $2.8 \times 10^{-7}:1$, and that in Example 7, the molar ratio of bisphenol A to diphenyl carbonate was changed to 1:1.03 and the molar ratio of disodium salt of bisphenol A to bisphenol A in the monomer mixture was changed to $2.8 \times 10^{-7}:1$. The polycarbonate in each of the polycarbonate compositions obtained in these Examples 6 and 7 was substantially free of a chlorine atom, and had a weight average molecular weight of 22,100. The polycarbonates obtained in these Examples 6 and 7 had terminal hydroxyl group contents of 25 mol % and 40 mol %, respectively. Further, in the polycarbonate compositions obtained in these Examples 6 and 7, the contents of sodium (alkali metal) were 50 ppb and 51 ppb, the contents of phenol (aromatic monohydroxy compound) were 93 ppm and 128 ppm, and the contents of an oligomer having a weight average molecular weight of 1,000 or less and/or a residual monomer were 0.53 wt % and 0.76 wt %, respectively. In each of the polycarbonate compositions obtained in these Examples 6 and 7, $T_1$ was 0.012649, and $T_2$ was 0.843177. With respect to the obtained polycarbonate compositions, various evaluations were made in accordance with the above-mentioned methods. Results are shown in Table 1.

Using the polycarbonate compositions obtained in these Examples 6 and 7 individually, pellets were individually obtained in substantially the same manner as in Example 1. The obtained pellets were subjected to continuous injection molding, and various evaluations were made in accordance with the above-mentioned methods. Results are shown in Table 2, together with the results of the measurements made with respect to the polycarbonate in each of the compositions in accordance with the above-mentioned methods.

EXAMPLE 8

Polymerizing materials [monomer mixture of bisphenol A and diphenyl carbonate (each being substantially free of a chlorine atom) in a molar ratio of 1:1.08] were charged into an agitation type polymerizer vessel having a capacity of 90 liters and a condensation polymerization was carried out at a temperature of 240° C., thereby obtaining a prepolymer having a weight average molecular weight of 7,800. The obtained prepolymer was crystallized by using acetone (a molar ratio of prepolymer to acetone was 1:0.3) and the obtained crystals were placed in a vertical, bottom-fixed cylinder type solid-state polymerizer vessel having a capacity of 100 liters. A solid-state polymerization was carried out in a flow of nitrogen gas at a flow rate of 1.5 m³ (volume at normal temperature and pressure) per kg of the prepolymer at a temperature of 220° C., thereby obtaining a polycarbonate composition. The polycarbonate in the obtained composition had a weight average molecular weight of 21,900. Subsequently, in order to reduce the amount of trace substances, such as aromatic monohydroxyl compound, contained in the obtained polycarbonate composition, the polycarbonate composition was allowed to stand in a solid-state polymerizer in a flow of nitrogen gas at a temperature of 170° C. for a period of about 6 hours.

The polycarbonate in the obtained composition was substantially free of a chlorine atom, and had a terminal hydroxyl group content of 2 mol %, based on the molar total of all terminal groups of the polycarbonate. Further, in the polycarbonate composition, the content of an alkali metal and/or an alkaline earth metal was 1 ppb, the content of phenol (aromatic monohydroxy compound) was 2 ppm, the content of an oligomer having a weight average molecular weight of 1,000 or less and/or a residual monomer was 0.2 wt %, $T_1$ was 0.012834, and $T_2$ was 0.854288. The polycarbonate composition was subjected to continuous injection molding, and various evaluations were made in accordance with the above-mentioned methods. Results are shown in Table 1.

100 parts by weight of the polycarbonate composition and a thermal stabilizer comprising 0.001 part by weight of bis(noylphenyl) hydrogen phosphite were mixed well by means of a Henschel mixer to obtain a homogeneous mixture. The obtained mixture was pelletized at 260° C. by means of an extruder. Then, the resultant pellet was subjected to continuous injection molding, and various evaluations were made in accordance with the above-mentioned methods. Results are shown in Table 2, together with the results of the measurements made with respect to the polycarbonate in the composition in accordance with the above-mentioned methods.

EXAMPLE 9

A polycarbonate composition was produced by melt transesterification by using a system comprising an agitation type reactor vessel having a capacity of 90 liters, a centrifugal wiped film evaporation type reactor and a twin-screw horizontal agitation type reactor vessel, all connected in series. Polymerizing materials [monomer mixture of bisphenol A and diphenyl carbonate (each being substantially free of a chlorine atom) in a molar ratio of 1:1.10 and, as a catalyst, disodium salt of bisphenol A (a molar ratio of disodium salt of bisphenol A to bisphenol A in the monomer mixture was $5 \times 10^{-7}:1$)] were charged into the agitation type reactor vessel and were melted at a temperature of 180° C. under atmospheric pressure. Then, the temperature of the agitation type reactor vessel was gradually elevated to 240° C. and the pressure in the agitation type reactor vessel was gradually lowered to 10 mmHg. The reaction conditions in the centrifugal wiped film evaporation type reactor were as follows: the reaction temperature was 260° C., and the reaction pressure was 3 mmHg. The reaction conditions in the twin-screw horizontal agitation type reactor vessel were as follows: the reaction temperature was 290° C., and the reaction pressure was 0.5 mmHg.

The polycarbonate in the obtained composition was substantially free of a chlorine atom, and had a terminal hydroxyl group content of 20 mol %, based on the molar total of all terminal groups of the polycarbonate, and a weight average molecular weight of 22,800. Further, in the polycarbonate composition, the content of sodium (alkali metal) was 95 ppb, the content of phenol (aromatic monohydroxy compound) was 130 ppm, the content of an oligomer having a weight average molecular weight of 1,000 or less and/or a residual monomer was 0.80 wt %, $T_1$ was 0.012033, and $T_2$ was 0.806153. The polycarbonate composition was subjected to continuous injection molding, and various evaluations were made in accordance with the above-mentioned methods. Results are shown in Table 1.

100 parts by weight of the polycarbonate composition and a thermal stabilizer comprising 0.002 part by weight of bis(noylphenyl) phosphite and 0.02 part by weight of tris (2,4-tert-butylphenyl) phosphite were mixed well by means of a Henschel mixer, to thereby obtain a homogeneous mixture. The obtained mixture was pelletized at 260° C. by means of an extruder. Then, the resultant pellet was subjected to continuous injection molding, and various evaluations were made in accordance with the above-mentioned methods. Results are shown in Table 2, together with the results of the measurements made with respect to the polycarbonate in the composition in accordance with the above-mentioned methods.

EXAMLE 10

A polycarbonate composition was obtained in substantially the same manner as in Example 9, except that a molar ratio of diphenyl carbonate to bisphenol A was 1.15:1, that a molar ratio of disodium salt of bisphenol A to bisphenol A was $5 \times 10^{-10}$:1, and that the maximum reaction temperature was elevated to 300° C. since the polymerization reaction rate was low. The obtained polycarbonate composition was yellowish. The polycarbonate composition was dissolved in tetrahydrofurane. The resultant solution was subjected to reprecipitation using methanol five times to obtain a precipitate. The obtained precipitate was dried in a flow of dried nitrogen gas at a flow rate of 5 liters/hr at 120° C. for 24 hours, thereby obtaining a dried polycarbonate composition.

The polycarbonate in the dried polycarbonate composition was substantially free of a chlorine atom, and had a terminal hydroxyl group content of 18 mol %, based on the molar total of all terminal groups of the polycarbonate, and a weight average molecular weight of 22,800. Further, in the dried polycarbonate composition, the content of sodium (alkali metal) was 0.1 ppb, the content of phenol (aromatic monohydroxy compound) was 0.8 ppm, the content of an oligomer having a weight average molecular weight of 1,000 or less and/or a residual monomer was 0.07 wt %, $T_1$ was 0.012033, and $T_2$ was 0.806153. With respect to the dried polycarbonate composition, various evaluations were made in accordance with the above-mentioned methods. Results are shown in Table 1.

COMPARATIVE EXAMPLE 4

100 parts by weight of a polycarbonate obtained from phosgene and bisphenol A by the phosgene process (interfacial process) and a thermal stabilizer comprising 0.002 part by weight of bis(nonylphenyl) hydrogen phosphite and 0.02 part by weight of tris(2,4-tertbutylphenyl) phosphite were mixed well by means of a Henschel mixer, to thereby obtain a homogeneous mixture. The obtained mixture was pelletized at 260° C. by means of an extruder, to thereby obtain a polycarbonate composition.

The polycarbonate (obtained by the phosgene process) in the obtained composition contained a chlorine ion and a chlorine atom. The chlorine ion content of the polycarbonate was 1.2 ppm by weight, and the chlorine atom content of the polycarbonate was 30 ppm by weight, based on the weight of the polycarbonate. The polycarbonate exhibited an absorbance of less than 0.01 at a wavelength of 400 nm in spectrophotometry, and had a terminal hydroxyl group content of 1 mol %, based on the molar total of all terminal groups of the polycarbonate, and a weight average molecular weight of 22,800. Further, in the polycarbonate composition, the content of an alkali metal and/or an alkaline earth metal was 82 ppb, the content of p-tert-butylphenol (aromatic monohydroxy compound) was 43 ppm, the content of an oligomer having a weight average molecular weight of 1,000 or less and/or a residual monomer was 1.4 wt %, $T_1$ was 0.012033, and $T_2$ was 0.806153.

Using the obtained polycarbonate composition, a pellet was obtained in substantially the same manner as in Example 1. The obtained pellet was subjected to continuous injection molding, and various evaluations were made in accordance with the above-mentioned methods. Results are shown in Table 2, together with the results of the measurements made with respect to the polycarbonate in the composition in accordance with the above-mentioned methods.

EXAMPLE 11

A polycarbonate composition was obtained in substantially the same manner as in Example 1, except that a thermal stabilizer comprising 0.002 part by weight of bis (nonylphenyl) hydrogen phosphite, 0.01 part by weight of tris(2,4-tert-butylphenyl) phosphite and 0.01 part by weight of octadecyl-3-(3,5-t-butyl-4-hydroxyphenyl) propionate was used.

The polycarbonate in the obtained composition was substantially free of a chlorine atom, had a weight average molecular weight of 22,100, and had a terminal hydroxyl group content of 7 mol %, based on the molar total of all terminal groups of the polycarbonate. Further, in the polycarbonate composition, the content of an alkali metal and/or an alkaline earth metal was 5 ppb, the content of an aromatic monohydroxy compound was 31 ppm, the content of an oligomer having a weight average molecular weight of 1,000 or less and/or a residual monomer was 0.48 wt %, $T_1$ was 0.012649, and $T_2$ was 0.843177.

Using the obtained polycarbonate composition, a pellet was obtained in substantially the same manner as in Example 1. The obtained pellet was subjected to continuous injection molding, and various evaluations were made in accordance with the above-mentioned methods. Results are shown in Table 2, together with the results of the measurements made with respect to the polycarbonate in the composition in accordance with the above-mentioned methods.

EXAMPLE 12

A polycarbonate composition was obtained in substantially the same manner as in Example 1, except that 0.02 part by weight of tris(2,4-tert-butylphenyl) phosphite was used as a thermal stabilizer.

The polycarbonate in the obtained composition was substantially free of a chlorine atom, had a weight average molecular weight of 22,100, and had a terminal hydroxyl group content of 7 mol %, based on the molar total of all terminal groups of the polycarbonate. Further, in the polycarbonate composition, the content of an alkali metal and/or an alkaline earth metal was 5 ppb, the content of an aromatic monohydroxy compound was 31 ppm, the content of an oligomer having a weight average molecular weight of 1,000 or less and/or a residual monomer was 0.48 wt %, $T_1$ was 0.012649, and $T_2$ was 0.843177.

Using the obtained polycarbonate composition, a pellet was obtained in substantially the same manner as in Example 1. The obtained pellet was subjected to continuous injection molding, and various evaluations were made in accordance with the above-mentioned methods. Results are shown in Table 2, together with the results of the measurements made with respect to the polycarbonate in the composition in accordance with the above-mentioned methods.

EXAMPLE 13

A polycarbonate composition was obtained in substantially the same manner as in Example 1, except that 0.002 part by weight of bis(nonylphenyl) hydrogen phosphite was used.

The polycarbonate in the obtained composition was substantially free of a chlorine atom, had a weight average molecular weight of 22,100, and had a terminal hydroxyl group content of 7 mol %, based on the molar total of all terminal groups of the polycarbonate. Further, in the polycarbonate composition, the content of an alkali metal and/or an alkaline earth metal was 5 ppb, the content of an aromatic monohydroxy compound was 31 ppm, the content of an oligomer having a weight average molecular weight of 1,000 or less and/or a residual monomer was 0.48 wt %, $T_1$ was 0.012649, and $T_2$ was 0.843177.

Using the obtained polycarbonate composition, a pellet was obtained in substantially the same manner as in Example 1. The obtained pellet was subjected to continuous injection molding, and various evaluations were made in accordance with the above-mentioned methods. Results are shown in Table 2, together with the results of the measurements made with respect to the polycarbonate in the composition in accordance with the above-mentioned methods.

TABLE 1

| Examples and Comparative Examples | Content of an alkali metal and/or an alkaline earth metal (ppb) | Content of an aromatic monohydroxy compound (ppm) | Content of an oligomer having a weight average molecular weight of 1,000 or less and/or a residual monomer (wt %) | Terminal hydroxyl group content (mol %) | Absorbance at a wavelength of 400 nm | Total number of crazes of molded articles (before recycling) | Total number of crazes of molded articles (after recycling) |
| --- | --- | --- | --- | --- | --- | --- | --- |
| Example 1 | 5 | 31 | 0.48 | 7 | 0.003 | 2 | 5 |
| Example 2 | 49 | 79 | 0.51 | 6 | 0.003 | 3 | 7 |
| Example 3 | 92 | 100 | 0.72 | 3 | 0.004 | 4 | 12 |
| Example 4 | 182 | 113 | 0.78 | 4 | 0.006 | 9 | 31 |
| Comparative Example 1 | 980 | 160 | 0.83 | 13 | 0.008 | 30 | >100 |
| Comparative Example 2 | 102 | 220 | 1.30 | 7 | 0.021 | 51 | >100 |
| Comparative Example 3 | 94 | 210 | 0.79 | 3 | 0.004 | 43 | >100 |
| Example 5 | 49 | 5 | 0.42 | 6 | 0.003 | 2 | 7 |
| Example 6 | 50 | 93 | 0.53 | 25 | 0.003 | 4 | 14 |
| Example 7 | 51 | 128 | 0.76 | 40 | 0.002 | 5 | 22 |
| Example 8 | 1 | 2 | 0.20 | 2 | 0.002 | 0 | 2 |
| Example 9 | 95 | 130 | 0.80 | 20 | 0.013 | 8 | 43 |
| Example 10 | 0.1 | 0.8 | 0.07 | 18 | 0.028 | 23 | 68 |

| Examples and Comparatives Examples | Number of molding shots in continuous molding before mold cleaning | Evaluation after the interruption of continuous molding* | |
| --- | --- | --- | --- |
| | | Number of black spots | Number of molding shots before obtaining an excellent article |
| Example 1 | 580 | 3 | 8 |
| Example 2 | 570 | 5 | 8 |
| Example 3 | 447 | 10 | 15 |
| Example 4 | 400 | 20 | 17 |
| Comparative Example 1 | 150 | 78 | |
| Comparative Example 2 | 71 | 84 | 35 |
| Comparative Example 3 | 128 | 73 | 41 |
| Example 5 | >600 | 3 | 6 |
| Example 6 | 480 | 18 | 16 |
| Example 7 | 360 | 19 | 16 |
| Example 8 | >600 | 2 | 4 |
| Example 9 | 295 | 24 | 26 |
| Example 10 | 430 | 18 | 20 |

*Evaluation of properties of a polycarbonate composition after a continuous molding has been interrupted and restarted

TABLE 2

| Examples and Comparative Examples | Content of an alkali metal and/or an alkaline earth metal (ppb) | Content of an aromatic monohydroxy compound (ppm) | Content of an oligomer having a weight average molecular weight of 1,000 or less and/or a residual monomer (wt %) | Terminal hydroxyl group content (mol %) | Total number of crazes of molded articles (before recycling) | Total number of crazes of molded articles (after recycling) |
|---|---|---|---|---|---|---|
| Example 1 | 5 | 31 | 0.48 | 7 | 0 | 3 |
| Example 2 | 49 | 79 | 0.51 | 6 | 0 | 5 |
| Example 3 | 92 | 100 | 0.72 | 3 | 1 | 8 |
| Example 4 | 182 | 113 | 0.78 | 4 | 3 | 21 |
| Comparative Example 1 | 980 | 160 | 0.83 | 13 | 22 | >100 |
| Comparative Example 2 | 102 | 220 | 1.30 | 7 | 31 | >100 |
| Comparative Example 3 | 94 | 210 | 0.79 | 3 | 26 | >100 |
| Example 5 | 49 | 5 | 0.42 | 6 | 0 | 4 |
| Example 6 | 50 | 93 | 0.53 | 25 | 1 | 10 |
| Example 7 | 51 | 128 | 0.76 | 40 | 2 | 13 |
| Example 8 | 1 | 2 | 0.20 | 2 | 0 | 2 |
| Example 9 | 95 | 130 | 0.80 | 20 | 2 | 33 |
| Comparative Example 4 | 82 | 43 | 1.30 | 1 | 36 | >100 |
| Example 11 | 5 | 31 | 0.48 | 7 | 0 | 4 |
| Example 12 | 5 | 31 | 0.48 | 7 | 16 | >100 |
| Example 13 | 5 | 31 | 0.48 | 7 | 0 | 2 |

| Examples and Comparatives Examples | Number of molding shots in continuous molding before mold cleaning | Evaluation after the interruption of continuous molding* | |
|---|---|---|---|
| | | Number of black spots | Number of molding shots before obtaining an excellent article |
| Example 1 | >600 | 2 | 6 |
| Example 2 | >600 | 3 | 6 |
| Example 3 | 547 | 5 | 10 |
| Example 4 | 510 | 9 | 12 |
| Comparative Example 1 | 211 | 27 | 30 |
| Comparative Example 2 | 98 | 28 | 31 |
| Comparative Example 3 | 173 | 23 | 33 |
| Example 5 | >600 | 1 | 3 |
| Example 6 | 597 | 7 | 13 |
| Example 7 | 453 | 9 | 15 |
| Example 8 | >600 | 1 | 3 |
| Example 9 | 375 | 12 | 18 |
| Comparative Example 4 | 75 | 42 | 49 |
| Example 11 | >600 | 1 | 3 |
| Example 12 | 526 | 4 | 9 |
| Example 13 | >600 | 3 | 7 |

*Evaluation of properties of a polycarbonate composition after a continuous molding has been interrupted and restarted

INDUSTRIAL APPLICABILITY

The polycarbonate composition of the present invention has an advantage in that it is substantially free from occurrence of crazing, even when experiences moist heat, and especially even when it has been recycled. Therefore, the polycarbonate composition of the present invention can be advantageously used as materials for medical and food-related equipments and appliances, which need to be often sterilized with steam or boiling water, and as materials for optical and electronic equipments, for example, an optical disc which needs to be stable when experiences moist heat. The polycarbonate composition of the present invention is also advantageous in that, when it is continuously injection-molded, the molding can be carried out with less necessity of interruption for mold cleaning, and that, even when the continuous molding is interrupted for mold cleaning or other reasons and then restarted, occurrence of unfavorable phenomena, such as deposition of black spots (carbonized material), and development of brown streaks, uneven color and the like, can be effectively suppressed, which unfavorable phenomena have conventionally been observed when a continuous molding is interrupted and restarted. Further, the polycarbonate composition of the present invention has excellent discoloration resistance and excellent thermal resistance. Therefore, the polycarbonate composition of the present invention can be advantageously used in various fields in which the appearance of a product produced from the polycarbonate composition is required to be excellent, such as a field in which the polycarbonate composition is injection-molded to produce a molded article.

We claim:

1. A polycarbonate composition comprising:
   (a) a substantially chlorine-atom free, aromatic dihydroxy compound/carbonic diester transesterification polycarbonate, wherein said polycarbonate (a) satisfies the following two requirements:
      (1) the chlorine atom content of the polycarbonate (a) is 0.5 ppm or less in terms of the chlorine ion content as measured by potentiometric titration using an aqueous 1/500N silver nitrate solution or by ion chromatography and (2) the chlorine atom content of the polycarbonate (a) is 10 ppm or less as measured by the combustion method,
   (b) at least one metal selected from the group consisting of an alkali metal and an alkaline earth metal,
   (c) an aromatic monohydroxy compound, and
   (d) at least one member selected from the group consisting of:
      an aromatic dihydroxy compound/carbonic diester transesterification oligomer having a weight average molecular weight of 1,000 or less; and
      a residual monomer selected from the group consisting of said aromatic dihydroxy compound, said carbonic diester and a mixture thereof,
      said components (b), (c) and (d) being, respectively, present in amounts of not more than 800 ppb by weight, not more than 200 ppm by weight, and not more than $T_2$% by weight, each based on the total weight of said components (a), (b), (c) and (d), wherein $T_2$ is defined by the following formula:

$$T_2 = 1{,}520{,}000 \times (\text{weight average molecular weight of said polycarbonate})^{-1.44}.$$

2. A polycarbonate composition according to claim 1, wherein the amounts of said components (b), (c) and (d) are, respectively, from 1 to 800 ppb by weight, from 1 to 200 ppm by weight, and from $T_1$ to $T_2$% by weight, each based on the total weight of said components (a), (b), (c) and (d), wherein $T_1$ is defined by the following formula:

$$T_1 = 1{,}130{,}000 \times (\text{weight average molecular weight of said polycarbonate})^{-1.60},$$

and $T_2$ is as defined above.

3. The polycarbonate composition according to claim 1, which further comprises (e) a thermal stabilizer in an amount of from 0.0005 to 0.22 part by weight, relative to 100 parts by weight of the total of said components (a), (b), (c) and (d).

4. The polycarbonate composition according to claim 3, wherein said thermal stabilizer (e) comprises at least one member selected from the group consisting of a phosphorous diester and a phosphorous monoester, said component (e) being present in an amount of from 0.0005 to 0.015 part by weight, relative to 100 parts by weight of the total of said components (a), (b), (c) and (d).

5. The polycarbonate composition according to claim 3, wherein said thermal stabilizer (e) comprises a mixture of (α) at least one member selected from the group consisting of a phosphorous diester and a phosphorous monoester, and (β) at least one member selected from the group consisting of a phenolic antioxidant, a phosphorous triester and a phosphinic diester, said components (α) and (β) being, respectively, present in amounts of from 0.0005 to 0.015 part by weight and from 0.0005 to 0.1 part by weight, each relative to 100 parts by weight of the total of said components (a), (b), (c) and (d).

6. The polycarbonate composition according to claim 1, wherein said polycarbonate has a terminal hydroxyl group in an amount of at most 30 mole %, based on the molar total of all terminal groups of the polycarbonate.

7. The polycarbonate composition according to claim 1, wherein said polycarbonate is obtained at a transesterification reaction temperature of not higher than 280° C.

8. The polycarbonate composition according to claim 1, wherein said polycarbonate exhibits an absorbance of less than 0.01 at a wavelength of 400 nm in spectrophotometry, as measured with respect to a sample obtained by dissolving 1.0 g of said polycarbonate in 7 ml of methylene chloride and placing the resultant solution in a cell having a light pass length of 1 cm.

9. The polycarbonate composition according to claim 1, wherein said polycarbonate has a weight average molecular weight in the range of from 12,000 to 80,000.

10. A molded article comprising the polycarbonate composition according to claim 1.

11. A molded article comprising the polycarbonate composition according to claim 3.

12. A molded article comprising the polycarbonate composition according to claim 4.

13. A molded article comprising the polycarbonate composition according to claim 5.

14. A molded article comprising the polycarbonate composition according to claim 6.

15. A molded article comprising the polycarbonate composition according to claim 7.

16. A molded article comprising the polycarbonate composition according to claim 8.

17. A molded article comprising the polycarbonate composition according to claim 9.

18. A polycarbonate composition comprising:
   (a) a substantially chlorine-atom free, aromatic dihydroxy compound/carbonic diester transesterification polycarbonate,
   (b) at least one metal selected from the group consisting of an alkali metal and an alkaline earth metal,
   (c) an aromatic monohydroxy compound, and
   (d) at least one member selected from the group consisting of:
      an aromatic dihydroxy compound/carbonic diester transesterification oligomer having a weight average molecular weight of 1,000 or less; and
      a residual monomer selected from the group consisting of said aromatic dihydroxy compound, said carbonic diester and a mixture thereof,
      said components (b), (c) and (d) being, respectively, present in amounts of not more than 800 ppb by weight, not more than 200 ppm by weight, and not more than $T_2$% by weight, each based on the total weight of said components (a), (b), (c) and (d), wherein $T_2$ is defined by the following formula:

$$T_2 = 1{,}520{,}000 \times (\text{weight average molecular weight of said polycarbonate})^{-1.44}.$$

* * * * *